(12) United States Patent
Ichikawa

(10) Patent No.: US 7,285,214 B2
(45) Date of Patent: Oct. 23, 2007

(54) HONEYCOMB STRUCTURE AND METHOD OF MANUFACTURING THE SAME

(75) Inventor: Yukihito Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 470 days.

(21) Appl. No.: 10/819,154

(22) Filed: Apr. 7, 2004

(65) Prior Publication Data
US 2004/0206062 A1    Oct. 21, 2004

(30) Foreign Application Priority Data
Apr. 21, 2003    (JP)    ............... 2003-115944

(51) Int. Cl.
*B01D 39/00*    (2006.01)
(52) U.S. Cl. .............. 210/510.1; 55/523; 126/628; 126/630; 428/116; 428/117; 264/628; 264/630
(58) Field of Classification Search ........... 55/385.3, 55/523, DIG. 5, DIG. 30; 210/510.1, 496; 264/400, 628–639; 422/180; 428/116, 117
See application file for complete search history.

(56) References Cited

U.S. PATENT DOCUMENTS

| | | | | |
|---|---|---|---|---|
| 4,662,911 A | * | 5/1987 | Hirayama et al. | ............ 55/282 |
| 6,673,300 B2 | * | 1/2004 | Allen et al. | ............... 264/400 |
| 2003/0041575 A1 | | 3/2003 | Ishihara et al. | |

FOREIGN PATENT DOCUMENTS

| | | |
|---|---|---|
| DE | 35 37 976 C1 | 4/1987 |
| EP | 0 225 402 A1 | 6/1987 |
| JP | A 62-139915 | 6/1987 |
| JP | A 4-301114 | 10/1992 |
| JP | 407-157377 | * 6/1995 |
| JP | A 2002-309922 | 10/2002 |
| JP | A 2002-317618 | 10/2002 |
| JP | A 2003-49627 | 2/2003 |

* cited by examiner

*Primary Examiner*—Joseph Drodge
(74) *Attorney, Agent, or Firm*—Oliff & Berridge, PLC

(57) ABSTRACT

There are disclosed a honeycomb structure which is preferably usable as a filter, for example, for trapping particulates in an exhaust gas of an internal combustion engine, boiler or the like or for filtering liquids such as city water and sewage and in which an increase of a pressure loss at a use time is inhibited. A honeycomb structure 1 comprises: two end surfaces 5 consisting of first and second end surfaces; a porous body 2 in which a plurality of fluid channels 3 extending to a second end surface 5b from a first end surface 5a are formed; and plugging members 4 for plugging end portions 6 on end surfaces 5 side of the fluid channels 3. One or more of first fluid channels 3a are formed in a shape in which an opening area (area (S1)) in the first end surface 5a is larger than a sectional area (area (S2)) vertical to a central axis in a position in a predetermined depth from the first end surface 5a and in which a sectional area (area (S3)) vertical to the central axis in a middle between the first end surface 5a and the position in the predetermined depth gradually decreases to the area (S2) from the area (S1).

22 Claims, 21 Drawing Sheets

HONEYCOMB STRUCTURE AND METHOD OF MANUFACTURING THE SAME

BACKGROUND OF THE INVENTION

1. Field of the Invention

The present invention relates to a honeycomb structure and a method of manufacturing the honeycomb structure, particularly to a honeycomb structure which is preferably usable as a filter, for example, for trapping particulates in an exhaust gas of an internal combustion engine, boiler or the like or for filtering liquids such as city water and sewage and in which an increase of a pressure loss at a use time is inhibited, and a method of manufacturing the honeycomb structure.

2. Description of the Related Art

There has been increasingly a need for removing particulates and toxic materials from an exhaust gas of an internal combustion engine, boiler or the like in consideration of an influence on an environment. Especially, regulations on removal of particulate materials exhausted from diesel engines have tended to be reinforced in Europe, America, and Japan, and a honeycomb filter in which a honeycomb structure is used has been used in a trapping filter (hereinafter referred to as DPF) for removing the particulate materials. The honeycomb filter in which the honeycomb structure is used has also been used in filtration of liquids such as city water and sewage (see Japanese Patent Application Laid-Open No. 4-301114, for example).

In general, as shown in FIGS. 21(a) and 21(b), the honeycomb filter for use in this purpose comprises a porous body 32 including an inflow end surface 42 and an outflow end surface 44 of a fluid, and a large number of fluid channels 33a, 33b whose sections have quadrangular shapes and which extend to the outflow end surface 44 from the inflow end surface 42. The adjacent fluid channels 33a, 33b are plugged in a one-end portion on an opposite side in such a manner that the inflow end surface 42 and outflow end surface 44 entirely form a checked pattern. In a honeycomb filter 31 constituted in this manner, fluids such as gas and liquid flow into the fluid channels 33b opened in the inflow end surface 42, that is, the fluid channels 33b plugged in the outflow end surface 44, flow through the porous body 32, and are discharged from the adjacent fluid channels 33a, that is, the fluid channels 33a plugged in the inflow end surface 42 and opened in the outflow end surface 44. In this case, a material to be filtered, contained in the fluid, is filtered by the porous body 32, and the filtered material is deposited on the surface of the porous body 32 constituting inner walls of the fluid channels 33b of the porous body 32.

However, when the honeycomb filter 31 using this honeycomb structure is used as a DPF or the like, many deposits such as soot are deposited on opening portions of the fluid channels 33b of the inflow end surface 42, then an area of the opening portion of the inflow end surface 42 decreases, or the opening portion of the inflow end surface 42 is blocked. This has caused problems that the pressure loss of the honeycomb filter 31 increases and that output drop and deterioration of fuel efficiency of the diesel engine are caused.

To solve the problem, as a filter in which the honeycomb structure is used, for example, a particulate filter 77 (honeycomb filter) shown in FIG. 22 has been proposed including partition walls 74 which define fluid channels 70, 71 (passages). The partition walls 74 are formed of porous materials including pores having a predetermined average pore diameter, and the end portions of the partition walls 74 are gathered and mutually and partially connected in such a manner that end-portion openings of the fluid channels 70, 71 have diameters larger than the pore diameters of the pores of the partition walls 74, but constitute small holes 75, 76 having a channel sectional area smaller than that of the original passage (see Japanese Patent Application Laid-Open No. 2003-49627, for example). A particulate filter 80 (honeycomb filter) shown in FIG. 23 has been proposed. The opposite end surfaces in a flow direction of an exhaust gas form a lattice shape in which the adjacent end surfaces are shifted by a half pitch, and two facing side surfaces continued inwardly from each end surface extend to the vicinity of the end surface on the opposite side in a triangular shape whose inner side is narrowed. Gas inflow side cells 82 and gas outflow side cells 83 are surrounded by walls 84 having a predetermined thickness and are accordingly constituted (see Japanese Patent Application Laid-Open No. 2002-317618, for example). As a device in which the honeycomb structure is used, an exhaust gas purification device 89 shown in FIGS. 24(a) and 24(b) has been proposed including a plurality of passages 86 surrounded by lattice-shaped walls 85 in the flow direction of the exhaust gas and whose rear end side and tip side are alternately plugged to form the gas inflow and outflow sides. Plugging portions 87 form protruding portions 88 protruding in a shape thinned toward an upstream side (see Japanese Patent Application Laid-Open No. 2002-309922, for example).

The honeycomb filters and exhaust gas purification device proposed in these related arts (Japanese Patent Application Laid-Open No. 2003-49627, Japanese Patent Application Laid-Open No. 2002-317618 and Japanese Patent Application Laid-Open No. 2002-309922) are formed so as to increase the area of the portion into which fluids to be treated such as the exhaust gas flow, and it is therefore possible to decrease the pressure loss at the use time.

However, for the above-described honeycomb filter, it is difficult to form the portions gathered or bonded in the end surface with good precision, and there has been a problem that gaps are easily formed in the bonded portions and the exhaust gas to be purified is discharged through the gaps of the bonded portions without being purified. There has also been a problem that the bonded portions have low mechanical strengths and are broken by vibration or pressure of the exhaust gas.

Moreover, in the exhaust gas purification device 89 shown in FIGS. 24(a) and 24(b), there are stepped portions 91 between the surfaces of the protruding portions 88 protruding in the end portions of the passages 86 and the tip portions of the lattice-shaped walls 85, and this causes a problem that the flow of a fluid 90 along the surface of the protruding portion 88 is reduced in this stepped portion and that an inflow resistance increases. Since the protruding portions 88 are formed independently of one another, the adjacent passage 86 is not defined between the end surface on the inflow side and the wall 85, and therefore the fluid 90 flowing into the exhaust gas purification device 89 flows in a direction different from an axial direction of the passage 86, for example, over the adjacent passages 86. This has caused a problem that the pressure loss of the end surface on the inflow side increases.

SUMMARY OF THE INVENTION

The present invention has been developed in consideration of the above-described situation, and an object thereof is to provide a honeycomb structure which is preferably usable as a filter, for example, for trapping particulates in an exhaust gas of an internal combustion engine, boiler or the like or for filtering liquids such as city water and sewage and in which an increase of a pressure loss at a use time is inhibited, and a method of manufacturing the honeycomb structure.

To achieve the above-described object, the present invention provides a honeycomb structure comprising: two end surfaces consisting of first and second end surfaces; a porous body in which a plurality of fluid channels extending to the second end surface from the first end surface are formed; and plugging members for plugging portions (end portions) having predetermined lengths from the end surfaces of the fluid channels, the fluid channels comprising first fluid channels whose end portions on the side of the second end surface are plugged by the plugging members and which are opened in the first end surface without being plugged by the plugging members, and second fluid channels whose end portions on the side of the first end surface are plugged by the plugging members and which are opened in the second end surface without being plugged by the plugging members, wherein one or more of the first fluid channels are formed in a shape in which an opening area (area (S1)) in the first end surface is larger than a sectional area (area (S2)) vertical to a central axis in a position in a predetermined depth from the first end surface and in which a sectional area (area (S3)) vertical to the central axis in a middle between the first end surface and the position in the predetermined depth gradually decreases to the area (S2) from the area (S1) (hereinafter sometimes referred to as "first invention").

In the honeycomb structure described above, it is preferable that a part of the porous body constituting an inner wall of the first fluid channel and extending to the position in the predetermined depth from the first end surface is removed, and the inner wall of the first fluid channel comprises the plugging member for plugging the end portion of the adjacent second fluid channel on the first end surface side instead of the removed part of the porous body.

In the honeycomb structure described above, it is preferable that the shape of the first fluid channel whose area (S3) gradually decreases to the area (S2) from the area (S1) is a truncated cone shape, a temple bell shape, or a morning glory shape.

In the honeycomb structure described above, it is preferable that one or more of the second fluid channels are formed in a shape in which an opening area (area (S4) in the second end surface is larger than a sectional area (area (S5)) vertical to the central axis in the position in the predetermined depth from the second end surface and in which a sectional area (area (S6)) vertical to the central axis in the middle between the second end surface and the position in the predetermined depth gradually decreases to the area (S5) from the area (S4).

In the honeycomb structure described above, it is preferable that a part of the porous body constituting an inner wall of the second fluid channel and extending to the position in the predetermined depth from the second end surface is removed, and the inner wall of the second fluid channel comprises the plugging member for plugging the end portion of the adjacent first fluid channel on the second end surface side instead of the removed part of the porous body.

In the honeycomb structure described above, it is preferable that the shape of the second fluid channel whose area (S6) gradually decreases to the area (S5) from the area (S4) is a truncated cone shape, a temple bell shape, or a morning glory shape.

In the honeycomb structure described above, it is preferable that the porous body is formed of a material whose main component is a ceramic and/or a metal.

In the honeycomb structure described above, it is preferable that the material constituting the porous body contains at least one selected from a group consisting of cordierite, mullite, alumina, spinel, silicon carbide, silicon nitride, aluminum nitride, zirconia, lithium aluminum silicate, aluminum titanate, Fe—Cr—Al-based metal, metal silicon, activated carbon, silica gel, and zeolite.

In the honeycomb structure described above, it is preferable that a catalyst is carried on the inner surface of the porous body forming the fluid channel and/or the inside of the porous body.

According to the present invention, there is also provided a method of manufacturing a honeycomb structure comprising a porous body in which a plugging material is charged in a fluid channel, the method comprising the steps of: extruding a raw material, which is to be fired to form the porous body, to form a non-fired porous body in which a plurality of fluid channels extending to a second end surface from a first end surface are formed; selectively charging the plugging material into either a portion (end portion) having a predetermined length from the second end surface or a portion (end portion) having a predetermined length from the first end surface in the fluid channels formed in the non-fired porous body to form a first fluid channel charged from the second end surface and to form a second fluid channel charged from the first end surface; and thereafter firing the non-fired porous body, wherein one or more of the first fluid channels are deformed in a shape in which an opening area (area (S1)) in the first end surface is larger than a sectional area (area (S2)) vertical to a central axis in a position in a predetermined depth from the first end surface and in which a sectional area (area (S3)) vertical to the central axis in a middle between the first end surface and the position in the predetermined depth gradually decreases to the area (S2) from the area (S1), before charging the plugging material into the end portion of the second fluid channel on the first end surface side (hereinafter referred to sometimes as "second invention".

According to the present invention, there is further provided a method of manufacturing a honeycomb structure comprising a porous body in which a plugging material is charged in a fluid channel, the method comprising the steps of: extruding a raw material, which is to be fired to form the porous body, to form a non-fired porous body in which a plurality of fluid channels extending to a second end surface from a first end surface are formed; selectively charging the plugging material into either a portion (end portion) having a predetermined length from the second end surface or a portion (end portion) having a predetermined length from the first end surface in the fluid channels formed in the non-fired porous body to form a first fluid channel charged from the second end surface and to form a second fluid channel charged from the first end surface; and thereafter firing the non-fired porous body, wherein one or more of the first fluid channels are deformed in a shape in which an opening area (area (S1)) in the first end surface is larger than a sectional area (area (S2)) vertical to a central axis in a position in a predetermined depth from the first end surface and in which a sectional area (area (S3)) vertical to the central axis in a middle between the first end surface and the position in the predetermined depth gradually decreases to the area (S2) from the area (S1), after charging the plugging material into the end portion of the second fluid channel on the first end surface side (hereinafter referred to sometimes as "third invention").

In the method of manufacturing the honeycomb structure described above, it is preferable that the method further comprises the steps of: changing the shape of the first fluid channel whose area (S3) gradually decreases to the area (S2) from the area (S1) into a truncated cone shape, a temple bell shape, or a morning glory shape.

In the method of manufacturing the honeycomb structure described above, it is preferable that the method further comprises the steps of: deforming one or more of the second fluid channels in a shape in which an opening area (area (S4)) in the second end surface is larger than a sectional area (area (S5)) vertical to a central axis in a position in a predetermined depth from the second end surface and in which a sectional area (area (S6)) vertical to the central axis in a middle between the second end surface and the position in the predetermined depth gradually decreases to the area (S5) from the area (S4), before charging the plugging material into the end portion of the first fluid channel on the second end surface side.

In the method of manufacturing the honeycomb structure described above, it is preferable that the method further comprises the steps of: deforming one or more of the second fluid channels in a shape in which an opening area (area (S4)) in the second end surface is larger than a sectional area (area (S5)) vertical to a central axis in a position in a predetermined depth from the second end surface and in which a sectional area (area (S6)) vertical to the central axis in a middle between the second end surface and the position in the predetermined depth gradually decreases to the area (S5) from the area (S4), after charging the plugging material into the end portion of the first fluid channel on the second end surface side.

In the method of manufacturing the honeycomb structure described above, it is preferable that the method further comprises the steps of: changing the shape of the second fluid channel whose area (S6) gradually decreases to the area (S5) from the area (S4) into a truncated cone shape, a temple bell shape, or a morning glory shape.

In the method of manufacturing the honeycomb structure described above, it is preferable that the method further comprises the steps of: adding water to the corresponding first and/or second end surface of the non-fired porous body to restore plasticity of the non-fired porous body before changing the shape of the first and/or second fluid channel.

In the method of manufacturing the honeycomb structure described above, it is preferable that the method further comprises the steps of: pressing a plate-shaped die for forming on whose surface a plurality of protrusions are formed onto the first and/or second end surface of the non-fired porous body to change the shape of the corresponding first and/or second fluid channel.

In the method of manufacturing the honeycomb structure described above, it is preferable that the method further comprises the steps of: rotating and pressing a columnar die for forming on whose peripheral side surface a plurality of protrusions are formed onto the first and/or second end surface of the non-fired porous body to change the shape of the corresponding first and/or second fluid channel.

In the method of manufacturing the honeycomb structure described above, it is preferable that the method further comprises the steps of: sticking a needle-shaped member for forming into the first and/or second end surface of the non-fired porous body to change the shape of the corresponding first and/or second fluid channel.

In the method of manufacturing the honeycomb structure described above, it is preferable that the method further comprises the steps of: picking up an image of the first and/or second end surface of the non-fired porous body and processing the picked-up image to specify a position into which the member for forming is to be stuck.

According to the present invention, there is still further provided a method of manufacturing a honeycomb structure comprising a porous body in which a plugging material is charged in a fluid channel, the method comprising the steps of: extruding a raw material, which is to be fired to form the porous body, to form a non-fired porous body in which a plurality of fluid channels extending to a second end surface from a first end surface are formed; selectively charging the plugging material into either a portion (end portion) having a predetermined length from the second end surface or a portion (end portion) having a predetermined length from the first end surface in the fluid channels formed in the non-fired porous body to form a first fluid channel charged from the second end surface and to form a second fluid channel charged from the first end surface; and thereafter firing the non-fired porous body, wherein one or more of the first fluid channels are deformed in a shape in which an opening area (area (S1)) in the first end surface is larger than a sectional area (area (S2)) vertical to a central axis in a position in a predetermined depth from the first end surface and in which a sectional area (area (S3)) vertical to the central axis in a middle between the first end surface and the position in the predetermined depth gradually decreases to the area (S2) from the area (S1), after firing the non-fired porous body (hereinafter referred to sometimes as "fourth invention").

In the method of manufacturing the honeycomb structure described above, it is preferable that the method further comprises the steps of: deforming one or more of the second fluid channels in a shape in which an opening area (area (S4)) in the second end surface is larger than a sectional area (area (S5)) vertical to a central axis in a position in a predetermined depth from the second end surface and in which a sectional area (area (S6)) vertical to the central axis in a middle between the second end surface and the position in the predetermined depth gradually decreases to the area (S5) from the area (S4), after firing the non-fired porous body.

In the method of manufacturing the honeycomb structure described above, it is preferable that the method further comprises the steps of: processing/removing the first and/or second end surface of the porous body to change the shape of the corresponding first and/or second fluid channel.

In the method of manufacturing the honeycomb structure described above, it is preferable that the method further comprises the steps of: picking up an image of the first and/or second end surface of the porous body and processing the picked-up image to specify a position to be processed/removed.

DESCRIPTION OF THE PREFERRED EMBODIMENT

A honeycomb structure of the present invention and a method of manufacturing the honeycomb structure will be described hereinafter in detail with reference to the drawings, but the present invention is not limited to the following embodiments.

Figure 1:
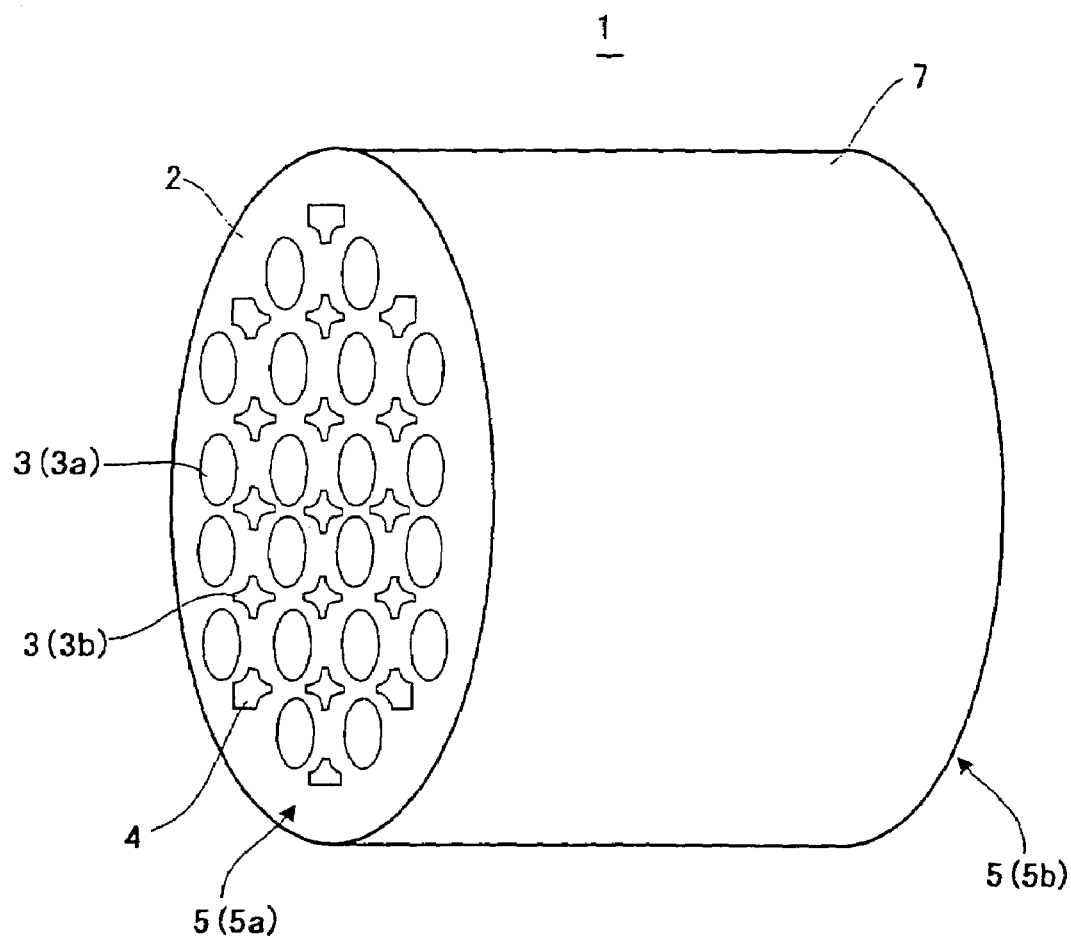
FIG. 1 is a perspective view showing one embodiment of a honeycomb structure of the present invention (first invention)
Figure 2A:
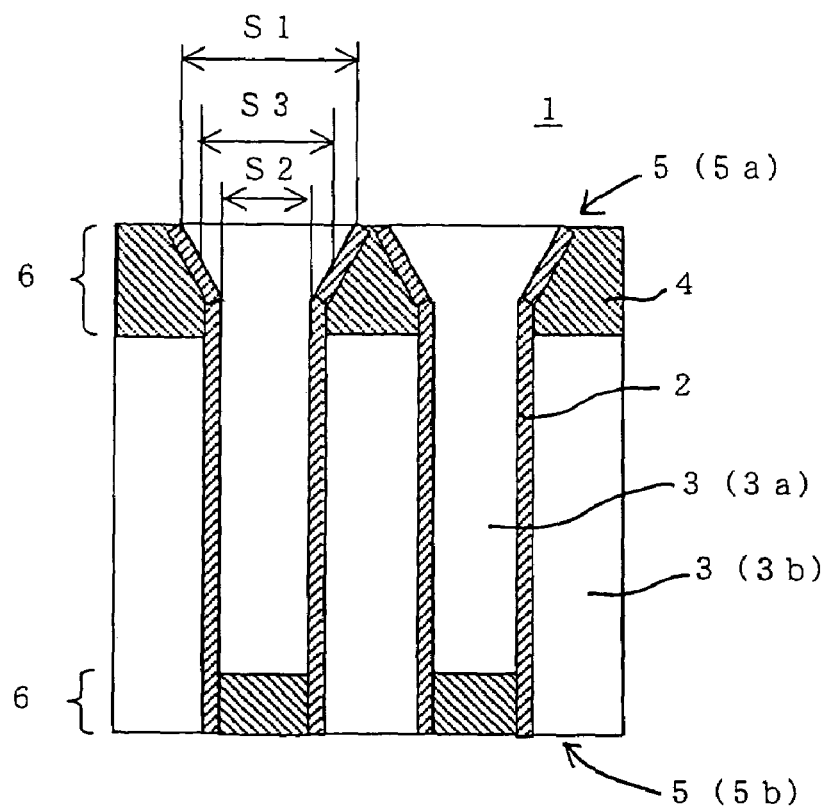
FIG. 2(a) is a sectional view showing one embodiment of the honeycomb structure of the present invention (first invention) cut in parallel with a central axis.
Figure 2B:
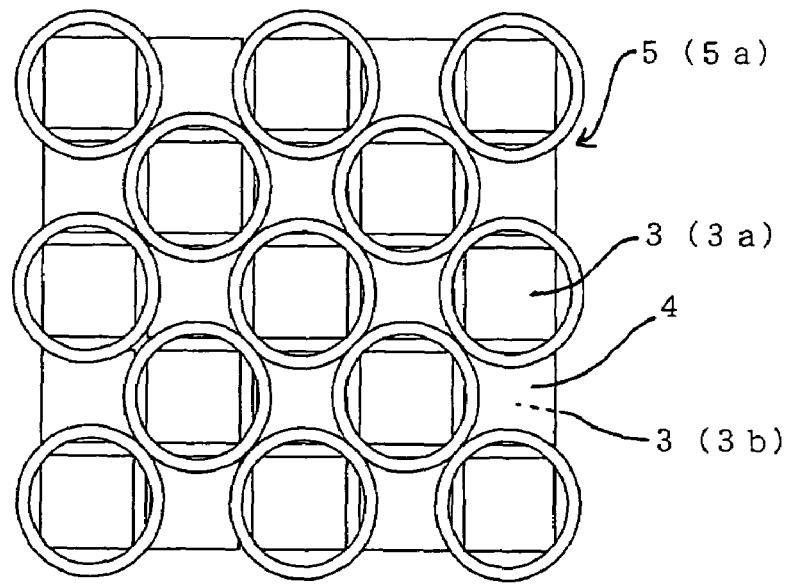
FIG. 2(b) is a plan view showing a first end surface of the honeycomb structure according to one embodiment of the present invention.

First, one embodiment of the honeycomb structure of the present invention (first invention) will be concretely described. As shown in FIGS. 1, 2(a), and 2(b), a honeycomb structure 1 of the present embodiment comprises: a porous body 2, including two end surfaces 5 consisting of first and second end surfaces, in which a plurality of fluid channels 3 extending to a second end surface 5b from a first end surface 5a are formed; and plugging members 4 for plugging portions (end portions 6) having predetermined lengths from the end surfaces 5 of the fluid channels 3. The fluid channels 3 comprise: first fluid channels 3a whose end portions on the side of the second end surface 5b are plugged by the plugging members 4 and which are opened in the first end surface 5a without being plugged by the plugging members 4; and second fluid channels 3b whose end portions 6 on the side of the first end surface 5a are plugged by the plugging members 4 and which are opened in the second end surface 5b without being plugged by the plugging members 4. One or more of the first fluid channels 3a are formed in a shape in which an opening area (area (S1)) in the first end surface 5a is larger than a sectional area (area (S2)) vertical to a central axis in a position in a predetermined depth from the first end surface 5a and in which a sectional area (area (S3)) vertical to the central axis in a middle between the first end surface 5a and the position in the predetermined depth gradually decreases to the area (S2) from the area (S1).

By this constitution, when the honeycomb structure 1 of the present embodiment is used as a filter, the opening area (area (S1)) in the end surface 5 on the side on which fluids such as an exhaust gas flow in, that is, the first end surface 5a can be larger than the sectional area (area (S2)) vertical to the central axis in the position in the predetermined depth from the first end surface 5a. Therefore, the pressure loss of the filter is reduced, and the opening area (area (S1)) is enlarged.

Accordingly, an opening portion of the end surface 5 is not easily blocked by particulate materials contained in the exhaust gas, such as soot, and an increase of pressure loss can be reduced. On the first end surface 5a side, the end portions 6 of the second fluid channels 3b other than the largely opened first fluid channels 3a are plugged by the plugging members 4. Therefore, it is possible to effectively prevent a breakage by impact or back pressure of a fluid to be treated, or a disadvantage that the fluid to be treated flows out of the end surface on the outflow side (second end surface 5b) without being treated. It is to be noted that, as shown in FIG. 2(a), the end portion 6 of the second fluid channel 3b adjacent to the first fluid channels 3a constituted in such a manner that the opening area (area (S1)) increases is formed in a shape gradually enlarged to the first end surface 5a from the position in the predetermined depth. For the honeycomb structure 1 of the present embodiment, in the first end surface 5a, the end portions 6 of the adjacent first fluid channels 3a are divided by the porous body 2, and the fluid flowing in on the first end surface 5a side flows into the predetermined first fluid channel 3a along an inner wall comprising the porous body. Therefore, the flow of the fluid between the adjacent first fluid channels 3a is not disturbed, and the pressure loss can be inhibited from dropping.

Figure 3A:
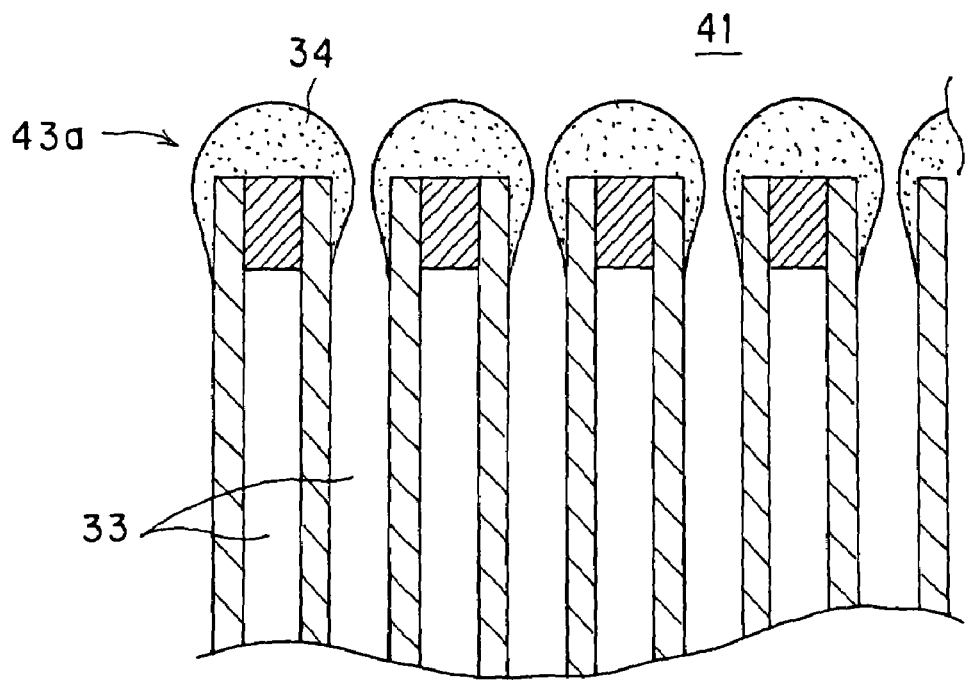
FIGS. 3(a) and 3(b) are sectional views schematically showing a process in which an open end portion of a cell constituting the honeycomb structure is blocked by particulates, when a conventional honeycomb structure is used as a filter.
Figure 3B:
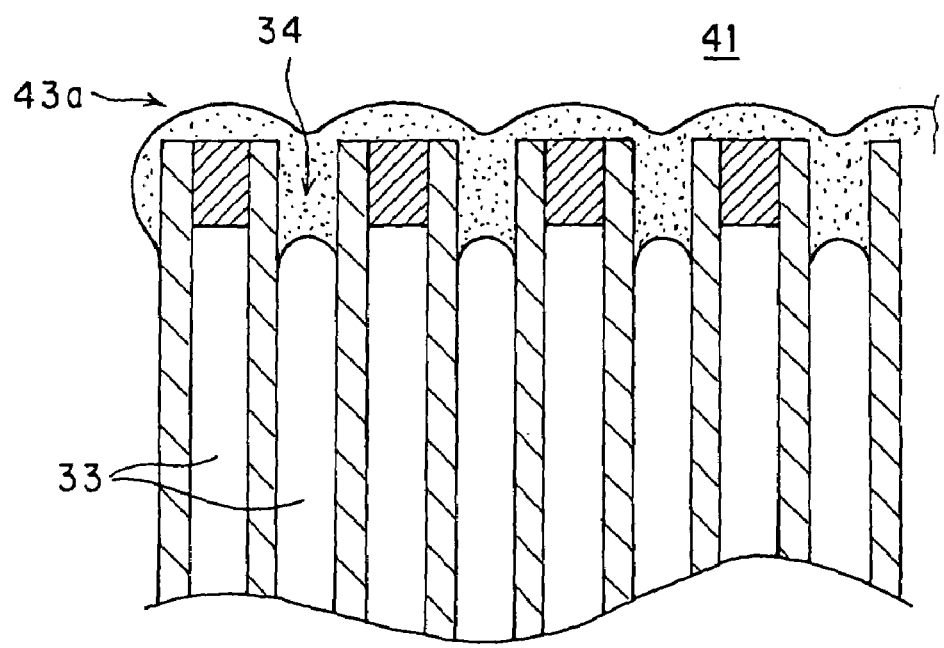

As shown in FIG. 3(a), in a honeycomb structure 41 for use in a DPF or the like, particulate materials 34 contained in an exhaust gas discharged from a diesel engine, such as soot, have been heretofore gradually deposited from an outer peripheral side of a first end surface 43a of a first fluid channel 33 to decrease the opening area. Finally, as shown in FIG. 3(b), the particulate materials 34 cause bridging to block the first end surfaces 43a of the first fluid channels 33. When all the first end surfaces 43a of the first fluid channels 33 constituting the honeycomb structure 41 are blocked, a problem occurs that a combustion exhaust gas cannot be discharged to the outside and the diesel engine breaks.

Therefore, the DPF or the like is heated, deposits such as soot are oxidized before the first end surfaces 43a are blocked, and the DPF or the like has to be frequently regenerated. As shown in FIG. 2(a), in the honeycomb structure 1 of the present embodiment, the opening area (area (S1)) in the first end surface 5a is constituted to be larger than the sectional area (area (S2)) vertical to the central axis in the position in the predetermined depth from the first end surface 5a. Therefore, a period until the end portions 6 on the first end surface 5a side of the first fluid channels 3a are blocked can be lengthened, and frequency of the above-described regeneration operation can be reduced. When the frequency of the regeneration operation is reduced, an unnecessary thermal stress is not caused in the DPF or the like, and therefore the porous body 2 constituting the honeycomb structure 1 can be inhibited from being degraded. It is to be noted that in the first end surface 5a, the depth of the portion having the shape in which the sectional area (area (S3)) vertical to the central axis of the first fluid channel gradually decreases to the area (S2) from the area (S1) is not especially limited. To smooth the gas flow, a change ratio of the gradual decrease to the area (S2) from the area (S1) is reduced. As a standard, the change ratio is preferably ¼ or more, further preferably ½ of an interval (cell pitch) of the adjacent fluid channels.

As shown in FIGS. 2(a) and 2(b), in the honeycomb structure 1 of the present embodiment, the shape of the first fluid channel 3a in which the sectional area (area (S3)) vertical to the central axis in the middle between the first end surface 5a and the position in the predetermined depth gradually decreases to the area (S2) from the area (S1) is preferably a truncated cone shape, a temple bell shape, or a morning glory shape. In this shape, it is possible to further lengthen the period until the end portions 6 of the first fluid channels 3a on the first end surface 5a side are blocked, and the increase of the pressure loss of the honeycomb structure 1 can be effectively reduced. Further in the present embodiment, since the sectional area of the plugging member 4 vertical to the central axis decreases toward a central direction from the first end surface 5a of the porous body 2, the plugging member 4 is physically prevented from being pushed to the outside or coming off the honeycomb structure 1 by the pressure of the fluid which has flown in the fluid channel 3. Therefore, a contact area between the plugging member 4 and the porous body 2 may be very small, and a length of the plugging member 4 charged from the end surface 5 may be substantially equal to a thickness of the porous body 2 constituting the inner wall of the fluid channel 3. By this constitution, a filtering area of the porous body 2 can be increased, and a passage resistance of the fluid can be reduced. It is also possible to reduce rigidity of the plugging member 4 constituted in this manner, and resistance to thermal shock of the honeycomb structure 1 is enhanced. Furthermore, since a thermal capacity of the plugging member 4 is reduced, the end portion 6 on the first end surface 5a side can be heated at a high temperature during the heating of the honeycomb structure 1, and it is possible to enhance a combustion regeneration efficiency of the particulate material. An effect of the thermal capacity reduction of the plugging member 4 can be anticipated from a viewpoint of prevention of blocking of the fluid channel 3 by the particulates in the exhaust gas in the end surface which is an inlet side of the fluid such as the exhaust gas. When the plugging member 4 is formed to be porous and is provided with permeability, the exhaust gas can be passed through the plugging member 4 and porous body 2 even in a portion in which the sectional area in the end portion of the fluid channels 3 gradually decreases, and this can contribute to the reduction of the pressure loss. The plugging member 4 may be provided with the permeability in the end surface on either an inlet or outlet side of the exhaust gas. However, when the plugging member 4 of the end surface on the inlet side is provided with the permeability, the particulates in the exhaust gas are captured in the portion having the gradually decreasing sectional area in the end portion on the inlet side of the fluid channel 3, and there is a possibility that the deposition of the particulates in the portion is promoted and that the inlet of the fluid channel 3 is blocked by the deposited particulates. Therefore, preferably the plugging member 4 on the inlet side of the exhaust gas is not provided with the permeability in some case.

Figure 4:
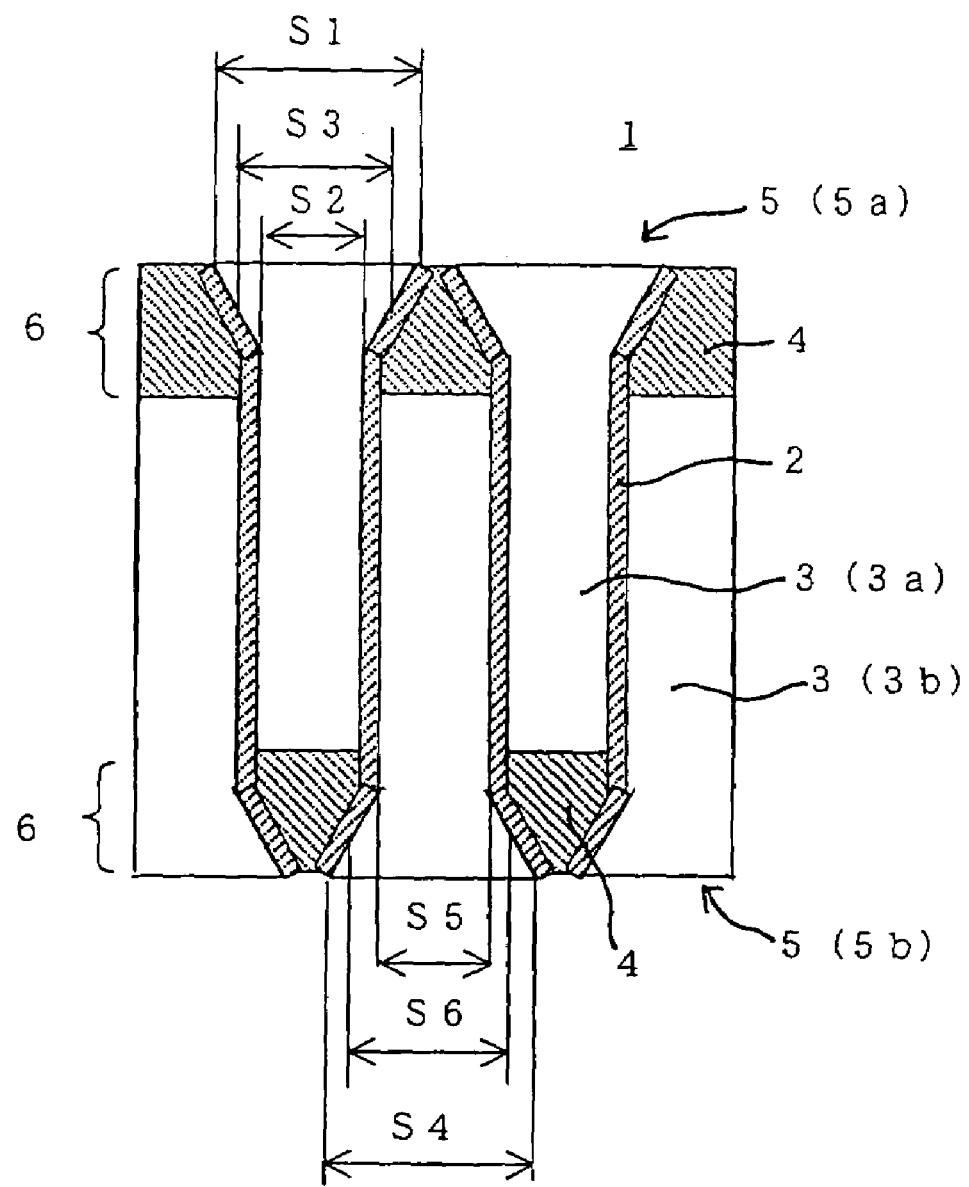
FIG. 4 is a sectional view showing another embodiment of the honeycomb structure of the present invention (first invention) cut in parallel with the central axis.

Moreover, in the present embodiment, as shown in FIG. 4, one or more of the second fluid channels 3b are formed in a shape in which an opening area (area (S4)) in the second end surface 5b is larger than a sectional area (area (S5)) vertical to the central axis in the position in the predetermined depth from the second end surface 5b and in which a sectional area (area (S6)) vertical to the central axis in the middle between the second end surface 5b and the position in the predetermined depth gradually decreases to the area (S5) from the area (S4). In this manner, when the areas (S1) and (S4) of the open end surfaces of the first and second fluid channels 3a, 3b are increased in the opposite end surfaces 5 of the honeycomb structure 1, the pressure loss related to the inflow and outflow of the exhaust gas can effectively be reduced. It is to be noted that the shape of the second fluid channel 3b whose area (S6) gradually decreases to the area (S5) from the area (S4) is also preferably the truncated cone shape, temple bell shape, or morning glory shape.

Figure 5A:
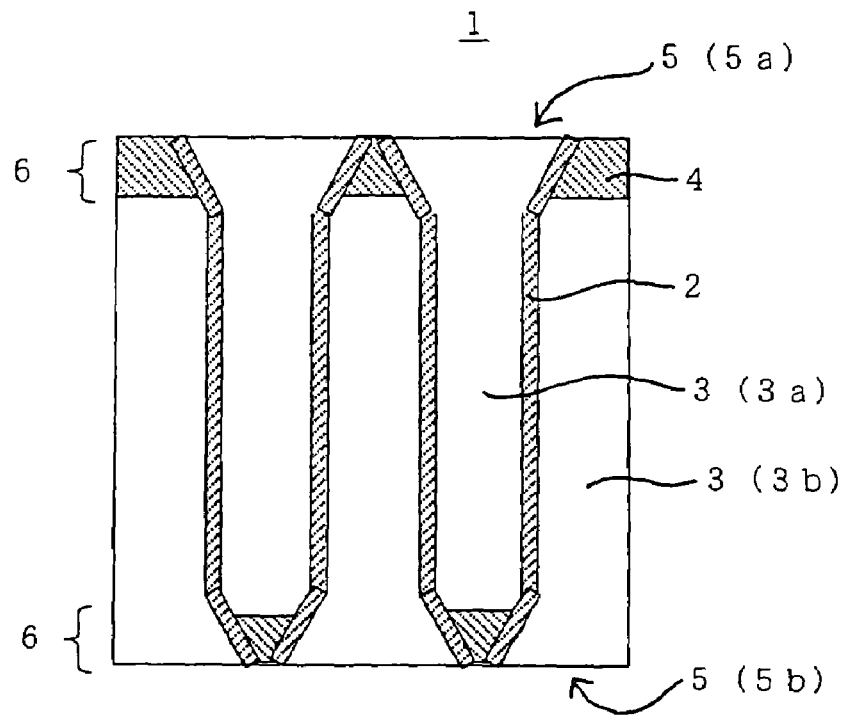
FIGS. 5(a) and 5(b) are sectional views of another embodiment of the honeycomb structure of the present invention (first invention) cut in parallel with the central axis.
Figure 5B:
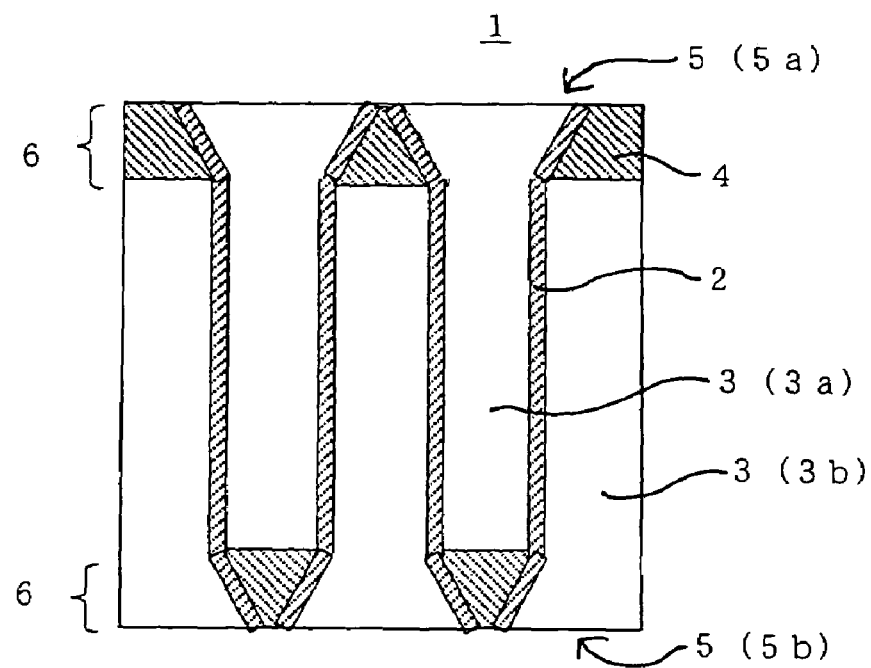

There are not any special restrictions on the plugging depth of the end portion 6 of the fluid channel 3 by the plugging member 4 in the end portions 6 on the second end surface 5b side of the first fluid channels 3a and on the first end surface 5a side of the second fluid channel 3b. For example, as shown in FIG. 4, the end portion may also be plugged deeper than position where the sectional area vertical to the central axes of the first and second fluid channels 3a, 3b starts increasing. Alternatively, as shown in FIG. 5(a), the end portion may also be plugged shallower than the position where the sectional area vertical to the central axes of the first and second fluid channels 3a, 3b starts increasing. Additionally, as shown in FIG. 5(b), the end portion may also be plugged to the same position as the position where the sectional area vertical to the central axes of the first and second fluid channels 3a, 3b starts increasing.

There are not any special restrictions on the material of the porous body 2 constituting the honeycomb structure 1 of the present embodiment shown in FIG. 2(a). From viewpoints of strength, thermal resistance, durability and the like, main components are preferably various ceramics of oxide or non-oxide, metals and the like. Concretely, examples of the ceramic include cordierite, mullite, alumina, spinel, silicon carbide, silicon nitride, aluminum nitride, zirconia, lithium aluminum silicate, aluminum titanate and the like. Examples of the metal include an Fe—Cr—Al-based metal, metal silicon and the like. One or more selected from these are preferable main components. Examples of the preferable material of the porous body 2 include adsorption materials such as activated carbon, silica gel, and zeolite. Furthermore, from the viewpoints of high strength and thermal resistance, at least one selected from a group consisting of alumina, mullite, zirconia, silicon carbide, and silicon nitride is preferable. From the viewpoints of thermal conductivity and thermal resistance, silicon carbide or a silicon-silicon carbide composite material is especially suitable. Here, the "main component" constitutes 50 mass % or more, preferably 70 mass % or more, further preferably 80 mass % of the porous body 2. A pore former may further be added to the material. The pore former is not limited as long as the material has a property of being flied/scattered/eliminated by a firing step. Inorganic materials such as a carbon material, high polymer compounds such as a plastic material, organic materials such as starch and the like may also be used alone or as a combination of two or more of the materials.

There are not any special restrictions on the materials of the plugging members 4 for plugging the end portions 6 of the first and second fluid channels 3a, 3b, but the main component of the material is preferably at least one selected from the above-described examples of the ceramics, metals, and adsorption materials which are the materials of the porous body 2 constituting the honeycomb structure 1.

Moreover, in the honeycomb structure 1 of the present embodiment, catalysts may be carried by the inner surface forming the fluid channel 3 of the porous body 2 and/or the inside of the porous body. Especially, when the honeycomb structure 1 is used as the DPF, a catalyst having a function of promoting the combustion of the particulate materials captured by the porous body 2 is preferable. Concrete examples of the catalyst include noble metals such as Pt, Pd, and Rh, a non-metallic perovskite catalyst and the like, and at least one type is preferably carried by the inner surface forming the fluid channel 3 of the porous body 2 and/or the inside of the porous body.

Figure 6A:
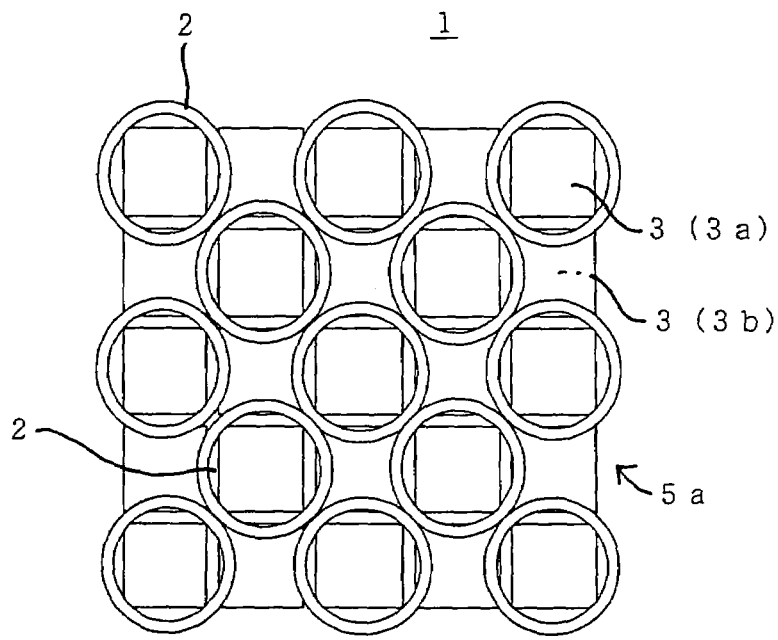
FIGS. 6(a) and 6(b) are plan views showing another embodiment of the honeycomb structure of the present invention (first invention)
Figure 6B:
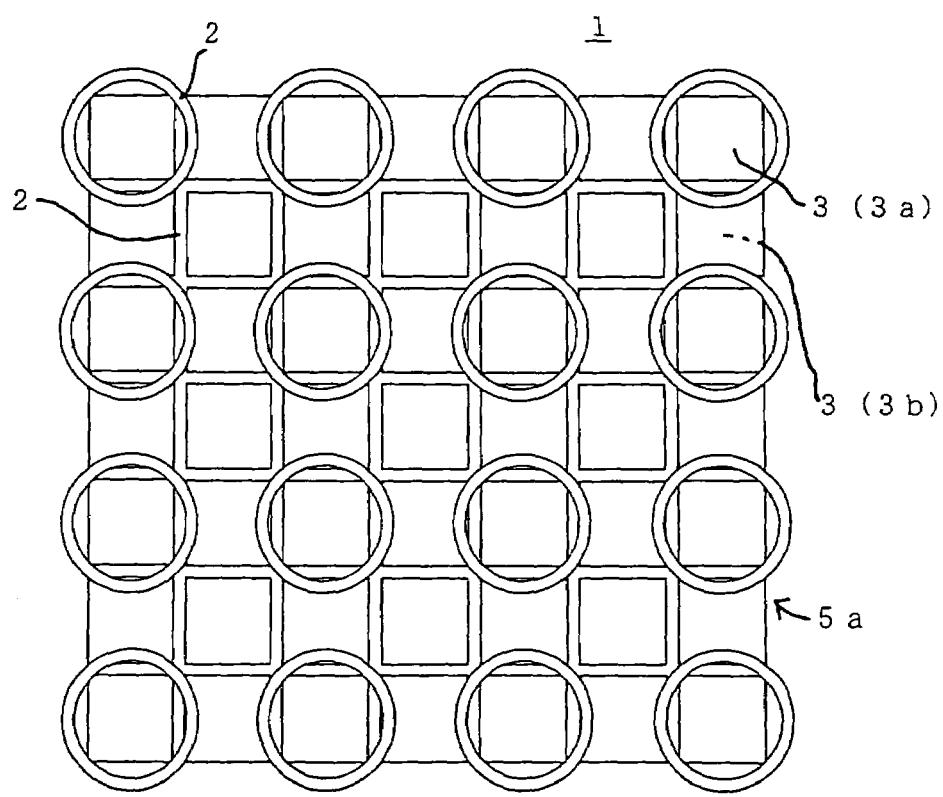

In the present embodiment, as shown in FIG. 6(a), the first fluid channels 3a may also be constituted in such a manner that all the opening areas (area (S1)) in the first end surface 5a of the porous body is larger than the sectional area (area (S2)) vertical to the central axis in the position in the predetermined depth from the first end surface 5a. For example, as shown in FIG. 6(b), the first fluid channels 3a may also be constituted to be regularly or irregularly enlarged every other fluid channel. It is to be noted that this also applies to the shape of the second fluid channel 3b in the second end surface 5b of the porous body 2 (see FIG. 2(a)).

There are not any special restrictions on the thickness of the porous body 2 for the portion forming the adjacent fluid channel 3 in the honeycomb structure 1 of the present embodiment shown in FIG. 2(a). However, when the porous body 2 is excessively thick, an initial pressure loss during the passing of the fluid is excessively large. When the body is excessively thin, the strength becomes insufficient. Both cases are not preferable. The thickness of the porous body 2 of the portion forming the adjacent fluid channel 3 is preferably 30 to 2000 μm, further preferably 40 to 1000 μm, especially preferably 50 to 750 μm. As shown in FIG. 1, the honeycomb structure 1 of the present embodiment preferably comprises an outer peripheral wall 7 with which an outer periphery of the porous body 2 is covered. From the viewpoint of strength enhancement of the honeycomb structure 1, the thickness of the outer peripheral wall 7 is preferably larger than that of the porous body 2 of the portion forming the fluid channel 3, and is in a range of preferably 45 to 600 μm, further preferably 60 to 4000 μm, especially preferably 75 to 2000 μm. It is to be noted that the outer peripheral wall 7 may be an integrally formed wall formed integrally with the porous body 2 at a forming time. Additionally, after the forming, the outer periphery of the porous body 2 may also be grounded in a predetermined shape, and coated with cement or the like to form the outer peripheral wall 7.

There are not any special restrictions on a pore diameter of the porous body 2 constituting the honeycomb structure 1 of the present embodiment, and the diameter may be appropriately selected by any person skilled in the art in accordance with applications. In general, the pore diameter can be selected in accordance with viscosity of the fluid to be treated, such as the exhaust gas, or an object to be separated. For example, when the honeycomb structure 1 is used in the DPF, the diameter is preferably set to about 1 to 100 μm on average. When the structure is used for purification of water, the diameter is preferably set to about 0.01 to 10 μm.

There are not any special restrictions on a porosity of the porous body 2 constituting the honeycomb structure of the present embodiment. However, for example, when the honeycomb structure 1 is used in the DPF, the porosity is preferably 20% or more, more preferably 40% or more, further preferably 60% or more. The thickness of the portion of the porous body 2 constituting the inner wall of the fluid channel 3 is reduced, the number of fluid channels 3 per unit area in the section vertical to the central axis of the honeycomb structure 1 (cell density) is decreased, that is, the sectional area of each fluid channel 3 is increased to raise the porosity. This is also a preferable mode from the viewpoint of the reduction of the initial pressure loss. For example, the thickness of the portion of the porous body 2 constituting the inner wall of the fluid channel 3 is 1.5 mm or less, more preferably 1 mm or less, further preferably 0.5 mm or less. The cell density is 300 cells/square inch or less, more preferably 200 cells/square inch or less, further preferably 100 cells/square inch or less. The porosity is 50% or more, more preferably 60% or more, further preferably 70% or more. On the other hand, when the porosity is excessively large, the strength is excessively insufficient, and therefore the porosity is preferably 90% or less. The thickness of the portion of the porous body 2 constituting the inner wall of the fluid channel 3 is further reduced to lower the porosity, and this is a preferable mode from the viewpoints of the reduction of the initial pressure loss while securing a thermal resistance and strength of the porous body 2. For example, the thickness of the porous body 2 constituting the inner wall of the fluid channel 3 is 0.4 mm or less, more preferably 0.3 mm or less, further preferably 0.2 mm or less. The porosity is 60% or less, more preferably 50% or less, further preferably 40% or less.

Furthermore, the honeycomb structure 1 is used as filters which have to reduce the pressure loss, such as a filter of such a type that the catalyst is carried and particulates are continuously burnt. In this case, the porosity is in a range of preferably 30 to 90%, further preferably 50 to 80%, especially preferably 50 to 75%. Moreover, the honeycomb structure is used as a filter of such a system that the catalyst for promoting combustion of the particulate material in the exhaust gas is carried by the porous body 2. In this case, the structure needs to be formed of a dense material having a high strength so as to bear a larger thermal stress generated at a combustion time of the particulate material. The porosity of this material is preferably 20 to 80%, further preferably 25 to 70%, especially preferably 30 to 60%. It is to be noted that the porosity means a volume %, and can be measured by a mercury porosimeter.

Moreover, in the present embodiment, in order to further ease an influence of heat during the combustion of the particulate material, the inner surface of the porous body 2 forming the fluid channel 3 and the pore surfaces may be coated with a single high thermal capacity material having the thermal resistance or a combination of different types of materials, such as aluminum titanate, alumina, mullite, silicon carbide, silicon nitride, zirconium, tungsten, and tantalum. Alternatively, a tissue of the porous body 2 may contain the material. When the material is contained inside the tissue of the porous body 2, the material may be either particulate or fibrous. With the fibrous material, short fibrous materials may be dispersed inside the tissue of the porous body 2, or long fibrous materials may preferably be arranged along a longitudinal direction of the fluid channel 3. The sectional shape of the particulate or fibrous high thermal capacity material is not especially limited.

Moreover, although not shown, the honeycomb structure of the present embodiment may also preferably comprise a plurality of integrated segments, or slits. When the structure is divided into a plurality of segments and integrated, or the slits are disposed, the thermal stress is dispersed, and cracks by the thermal stress can effectively be prevented from being generated. There are not any special restrictions on a size or shape of each segment in a case where the honeycomb structure is segmented and integrated, but when each segment is excessively large, the effect of the prevention of the generation of cracks by the segmentation is not sufficiently fulfilled. When the segment is excessively small, the integration of the respective segments by the manufacturing or the bonding is unfavorably laborious. Therefore, the sectional area of the segment is preferably 900 to 10000 mm$^2$, further preferably 900 to 5000 mm$^2$, especially preferably 900 to 3600 mm$^2$. When the structure is used as the filter, 70% by volume or more of the total volume of the honeycomb structure is preferably formed of the honeycomb segments having this size. For the preferable shape of the segment, for example, a basic sectional shape of the segment is a quadrangular shape, that is, the segment has a quadratic prism shape. The shape of the segment on the outer peripheral side can be appropriately selected in accordance with the shape of the integrated honeycomb structure. There are not any special restrictions on the entire sectional shape of the honeycomb structure. The shape is not limited to a circular shape shown in FIG. 1. For example, in addition to an elliptic shape, a race track shape, substantially circular shapes such as an oblong shape, or polygonal shapes such as a quadrangular shape and hexagonal shape may also be used. In the honeycomb structure of the present embodiment, the shape of the section vertical to the central axis of the fluid channel is not limited to a square shape shown in FIG. 1, and the polygonal shapes such as a triangular shape, rectangular shape, and hexagonal shape may also be used.

Figure 7:
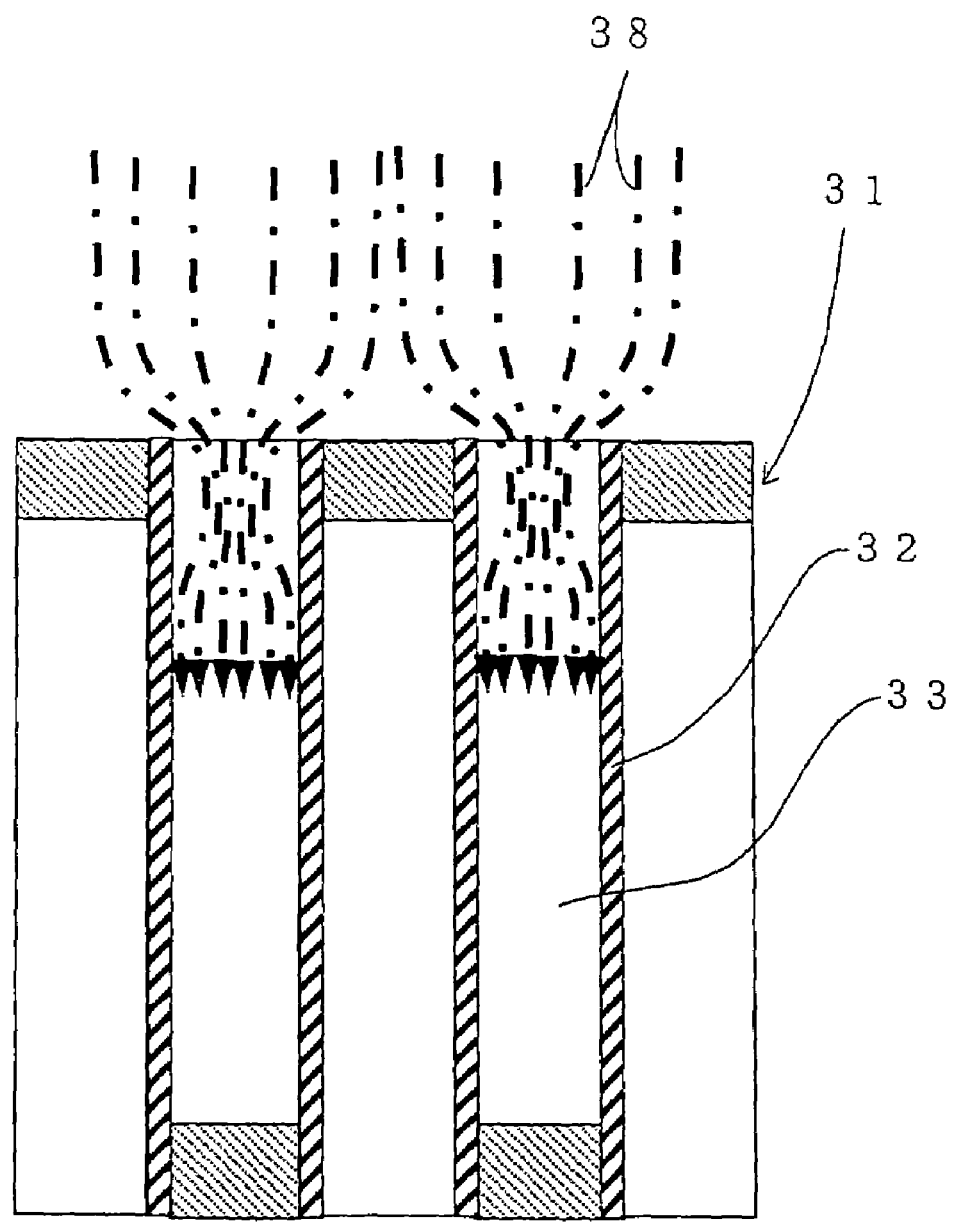
FIG. 7 is a sectional view schematically showing a process in which captured particulate materials are deposited on partition walls of the honeycomb structure, when the conventional honeycomb structure is used as the filter.

Here, a process in which the captured particulate material is deposited on the surface constituting the inner wall of the fluid channel of the particulate material will be described in a case where the general honeycomb structure is used as a honeycomb filter. As shown in FIG. 7, when an exhaust gas 38 flows into a honeycomb filter 31, the exhaust gas 38 is bent in inlet portions (end portions) of fluid channels 33, and flows into the fluid channels 33 once in a contracted state, and stagnation is made in the flow of the exhaust gas 38 in the inlet portions of the fluid channels 33. A flow rate of the exhaust gas 38 is very low in this stagnation part. Since the particulate material contained in the exhaust gas 38 also has a low passage rate in the stagnation portion, the material is easily captured by porous bodies 32, and many particulate materials are deposited in the inlet portions of the fluid channels 33.

Figure 8A:
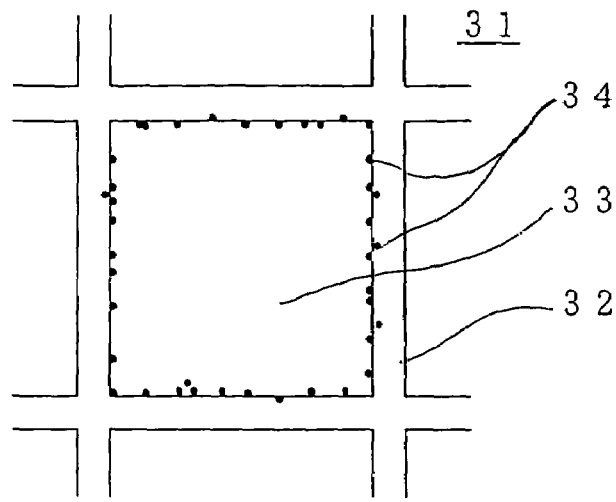
FIGS. 8(a) to 8(c) are enlarged plan views of the cell constituting the honeycomb structure schematically showing the process in which the captured particulate materials are deposited on the partition walls, when the conventional honeycomb structure is used as the filter.
Figure 8B:
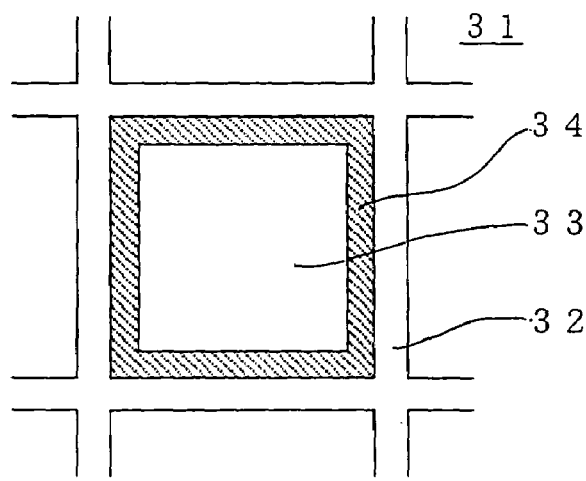
Figure 8C:
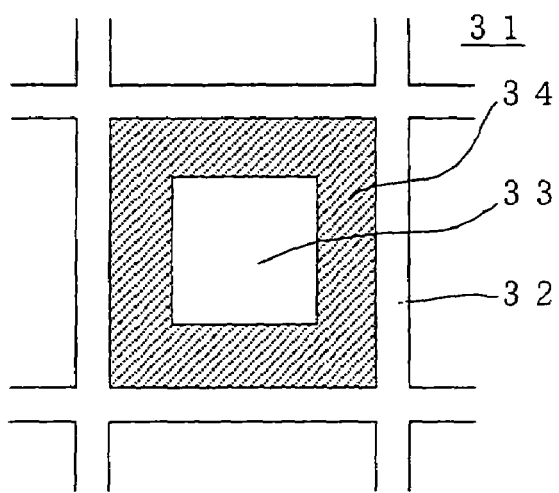

The process in which the particulate material is deposited can be largely divided into three stages as shown in FIGS. 8(*a*) to 8(*c*). In a first stage (inertial collision and Brownian movement), as shown in FIG. 8(*a*), the particulate materials 34 are captured by the surface of the porous body 32 forming the fluid channel 33 and the inside of pores formed in the surface, and the deposition of the particulate materials 34 into the pores proceed. Accordingly, the inlets of the pores are blocked, the surface of the porous body 32 forming the fluid channel 33 starts to be coated with deposit layers of the particulate materials 34, and the pressure loss of the honeycomb filter 31 rapidly rises. In this first stage, since many particulate materials 34 pass through the pores, a capture efficiency is low. When the pre diameter is rough and large, the inlets of the pores are not blocked by the deposited particulate materials 34. Even when the inlets are blocked, much time is required.

When the particulate materials 34 are further deposited after the first stage, the deposition enters a second stage (initial direct interrupt). As shown in FIG. 8(*b*), the thickness of the deposit layer of the particulate materials 34 deposited on the surface of the porous body 32 forming the fluid channel 33 gradually increases. In the second stage, the pressure loss rises in proportion to the thickness of the deposit layer of the particulate materials 34. It is to be noted that in the second stage, the deposit layer comprising the particulate materials 34 forms a cake layer, and captures the particulate materials 34, and therefore the capture efficiency of the honeycomb filter 31 increases.

When the second stage elapses, and the particulate materials 34 are further deposited on the surface of the porous body 32 forming the fluid channel 33, the deposition enters a third stage (later direct interrupt). As shown in FIG. 8(*c*), when the deposit layer comprising the particulate materials 34 rapidly thickens, the fluid channel 33 narrows, and the passage resistance of the fluid channel 33 increases. Therefore, the pressure loss of the honeycomb filter 31 rapidly increases.

Therefore, when the honeycomb structure is used as the honeycomb filter, it is preferable to maintain the second stage longer, and the honeycomb filter is preferably regenerated in the second stage. As shown in FIG. 2(*a*), in the honeycomb structure 1 of the present embodiment, one or more of the first fluid channels 3*a* are formed in the shape in which the opening area (area (S1)) in the first end surface 5*a* is larger than the sectional area (area (S2)) vertical to the central axis in the position in the predetermined depth from the first end surface 5*a* and in which the sectional area (area (S3)) vertical to the central axis in the middle between the first end surface 5*a* and the position in the predetermined depth gradually decreases to the area (S2) from the area (S1). Therefore, the first and second stages in the deposition process of the particulate materials are maintained long, and the rise of the pressure loss can be reduced.

Figure 9A:
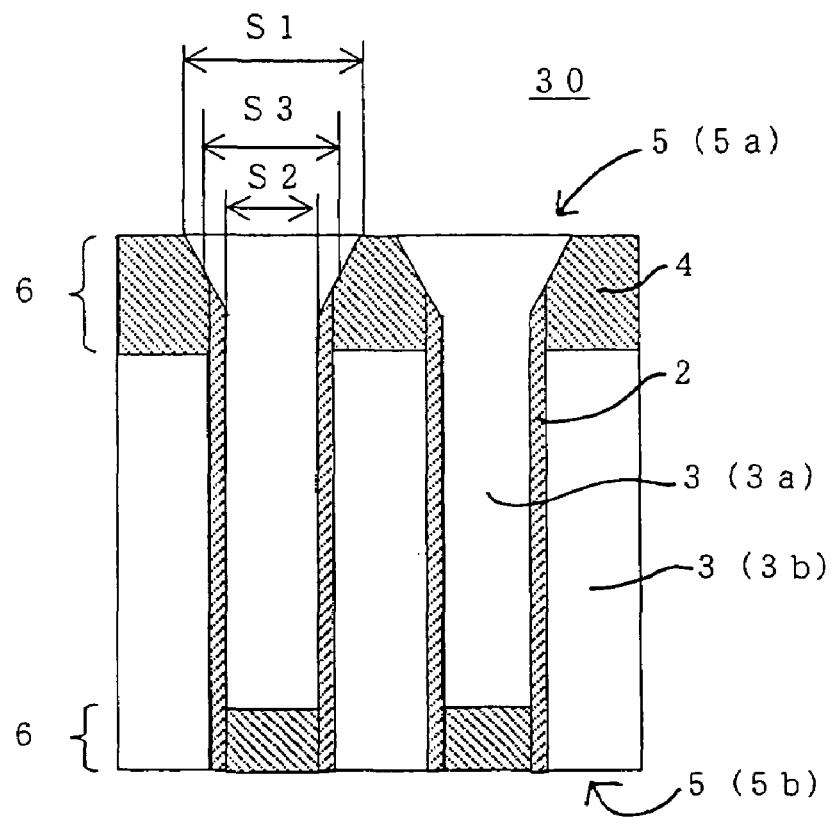
FIG. 9(a) is a sectional view of another embodiment of the honeycomb structure of the present invention (first invention) cut in parallel with the central axis.
Figure 9B:
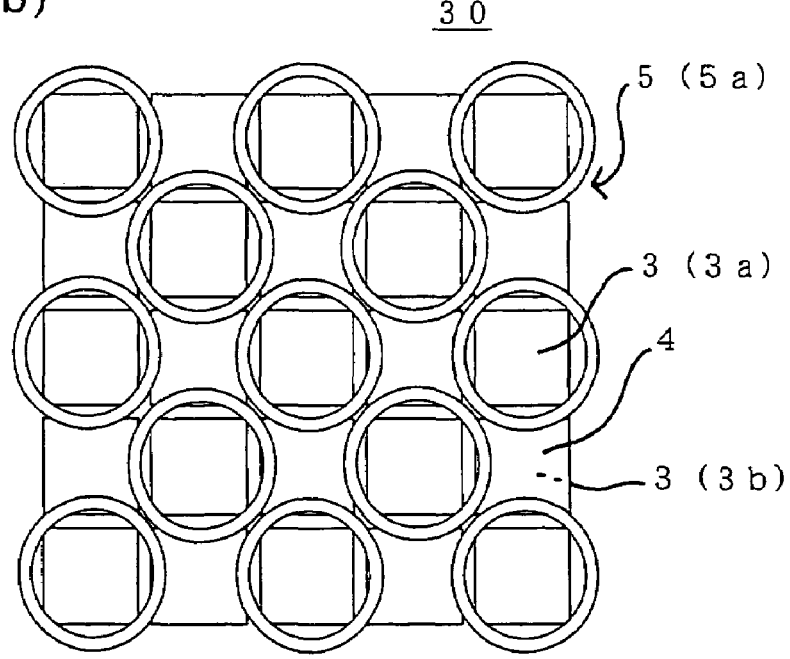
FIG. 9(b) is a plan view showing a first end surface of the honeycomb structure according to another embodiment of the present invention.

Next, another embodiment of the honeycomb structure of the present invention (first invention) will be described. FIG. 9(*a*) is a sectional view of the honeycomb structure of the present embodiment cut in parallel with the central axis, and FIG. 9(*b*) is a plan view showing the first end surface of the honeycomb structure of the present embodiment. As shown in FIGS. 9(*a*) and 9(*b*), a honeycomb structure 30 of the present embodiment comprises: the porous body 2, including two end surfaces 5 consisting of first and second end surfaces, in which a plurality of fluid channels 3 extending to the second end surface 5*b* from the first end surface 5*a* are formed; and the plugging members 4 for plugging the portions (end portions 6) having the predetermined lengths from the end surfaces 5 of the fluid channels 3. The fluid channels 3 comprise: the first fluid channels 3*a* whose end portions on the side of the second end surface 5*b* are plugged by the plugging members 4 and which are opened in the first end surface 5*a* without being plugged by the plugging members 4; and the second fluid channels 3*b* whose end portions 6 on the side of the first end surface 5*a* are plugged by the plugging members 4 and which are opened in the second end surface 5*b* without being plugged by the plugging members 4. One or more of the first fluid channels 3*a* are formed in a shape in which the opening area (area (S1)) in the first end surface 5*a* is larger than the sectional area (area (S2)) vertical to the central axis in the position in the predetermined depth from the first end surface 5*a* and in which the sectional area (area (S3)) vertical to the central axis in the middle between the first end surface 5*a* and the position in the predetermined depth gradually decreases to the area (S2) from the area (S1). It is to be noted that in the honeycomb structure 30 of the present embodiment, a part of the porous body 2 constituting the inner wall of the first fluid channel 3*a* and extending to the position in the predetermined depth from the first end surface 5*a* is removed, and the inner wall of the first fluid channel 3*a* comprises the plugging member 4 for plugging the end portion 6 of the adjacent second fluid channel 3*b* on the first end surface 5*a* side instead of the removed part of the porous body 2.

In the honeycomb structure 1 of the embodiment shown in FIGS. 2(*a*) and 2(*b*), the inner wall of the first fluid channel 3*a* to the second end surface 5*b* from the first end surface 5*a* entirely comprises the porous body 2. However, as shown in FIG. 9(*a*), in the honeycomb structure 30 of the present embodiment, a part of the porous body 2 to the position in the predetermined depth from the first end surface 5*a* is removed, and the inner wall of the first fluid channel 3*a* comprises the plugging member 4 for plugging the end portion 6 of the adjacent second fluid channel 3*b* on the first end surface 5*a* side instead of the removed part of the porous body 2. By this constitution, a function or an effect similar to that of the honeycomb structure 1 of the embodiment shown in FIG. 1 can be obtained. It is to be noted that in the honeycomb structure 30 of the present embodiment, the end portions 6 of the adjacent first fluid channels 3*a* are defined by the porous body 2 and plugging member 4, and the fluid which has flowed in on the first end surface 5*a* side flows into the predetermined first fluid channel 3*a* along the inner wall. Therefore, any disturbance is not caused in the flow of fluid between the adjacent first fluid channels 3*a*, and the pressure loss can be inhibited from dropping.

Moreover, in the present embodiment, although not shown, a part of the porous body constituting the inner wall of the second fluid channel and extending to the position in the predetermined depth from the second end surface 5*a* may also be removed, and the inner wall of the second fluid channel may comprise the plugging member for plugging the end portion of the adjacent first fluid channel on the second end surface side instead of the removed part of the porous body.

Furthermore, as shown in FIG. 9(*a*), in the honeycomb structure 30 of the present embodiment, since a portion constituting a boundary between the plugging member 4 and the porous body 2 is formed in a tapered shape, a contracted flow of the inflow fluid can be inhibited from being generated.

The porous bodies 2 and plugging members 4 constituting the honeycomb structure 30 of the present embodiment constituted in the same manner as in the porous bodies 2 and plugging members 4 constituting the honeycomb structure 1 shown in FIG. 1 are preferably usable.

Next, one embodiment of a method of manufacturing the honeycomb structure according to the present invention (second invention) will be described. In the method of manufacturing the honeycomb structure of the present embodiment, a raw material, which is to be fired to form the porous body is extruded/formed to form a non-fired porous body in which a plurality of fluid channels extending to the second end surface from the first end surface are formed. A plugging material is selectively charged into either a portion (end portion) having a predetermined length from the second end surface or a portion (end portion) having a predetermined length from the first end surface in the fluid channels formed in the non-fired porous body to form a first fluid channel charged from the second end surface and to form a second fluid channel charged from the first end surface. Thereafter, the non-fired porous body is fired to manufacture the honeycomb structure comprising the porous body in which the plugging material is charged in the fluid channel. One or more of the first fluid channels are deformed in the shape in which the opening area (area (S1)) in the first end surface is larger than the sectional area (area (S2)) vertical to the central axis in the position in the predetermined depth from the first end surface and in which the sectional area (area (S3)) vertical to the central axis in the middle between the first end surface and the position in the predetermined depth gradually decreases to the area (S2) from the area (S1), before charging the plugging material into the end portion of the second fluid channel on the first end surface side.

By this constitution, the honeycomb structure shown in FIG. 1 can be manufactured easily at a low cost. The method of manufacturing the honeycomb structure of the present embodiment will be described more concretely hereinafter.

First, a raw material which is to be fired to form the porous body is prepared. In this raw material, a material containing the main component of the ceramic and/or metal which is the example of the material of the porous body 2 constituting the honeycomb structure 1 shown in FIG. 1 is preferably usable. Concretely, a foaming resin is added as the pore former to silica, kaolin, talc, and alumina which are cordierite raw materials, further a binder, dispersant, and water are added, and the materials are kneaded to form a clay-like raw material. The pore former is not limited as long as the material has the property of disappearing by the firing. The inorganic materials such as the carbon material, high polymer compounds such as the plastic material, organic materials such as starch and the like may also be used alone or as the combination.

Next, the raw material obtained in this manner is extruded/formed by the use of a die for extruding the honeycomb structure, including slits having predetermined shapes. For the constitution of the die for extruding the honeycomb structure, the die for extruding the honeycomb structure, for use in manufacturing the conventional honeycomb structure, is preferably usable. The obtained non-fired porous body is very soft, and is deformable by its own weight, and therefore the non-fired porous body may also be dried if necessary. As drying means, various methods can be carried out, but the body is preferably dried by a combination of microwave drying with hot air drying or a combination of dielectric drying with the hot air drying. Additionally, special methods such as freezing drying are preferably usable. The opposite end surfaces of the non-fired porous body may also be cut/processed to have a specific length. The above-described manufacturing steps can be carried out in conformity with the method of manufacturing the conventional honeycomb structure.

Figure 10A:
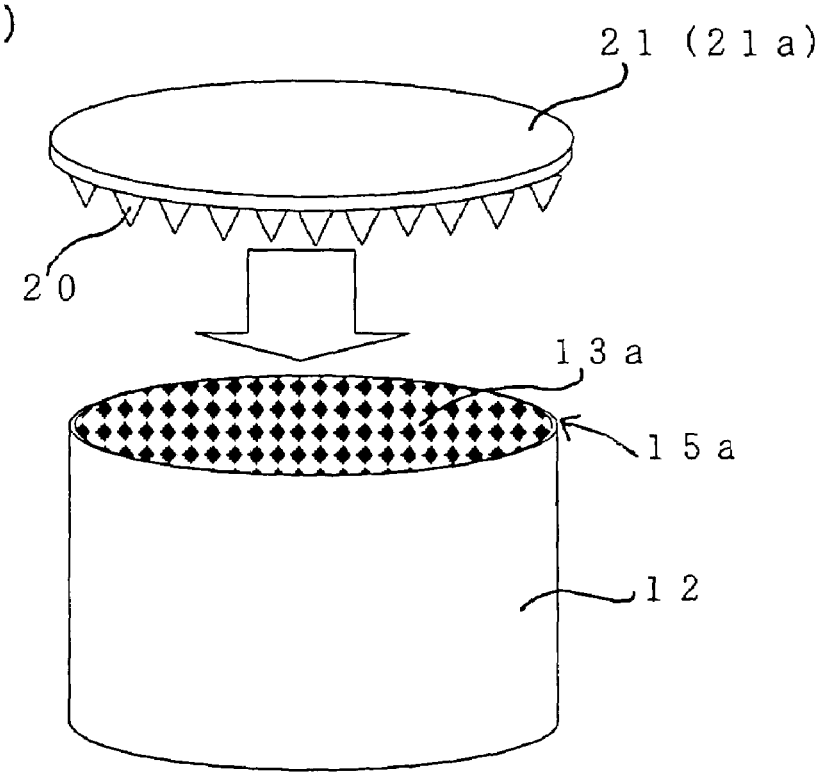
FIGS. 10(a) and 10(b) are perspective views schematically showing a step of deforming a first fluid channel by use of a plate-shaped die for forming in one embodiment of a method of manufacturing the honeycomb structure of the present invention (second invention)
Figure 10B:
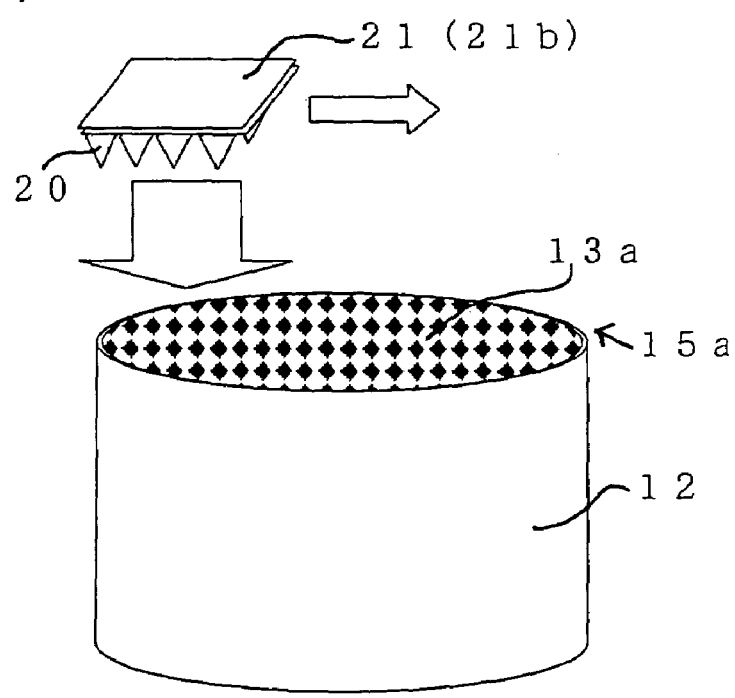
Figure 11:
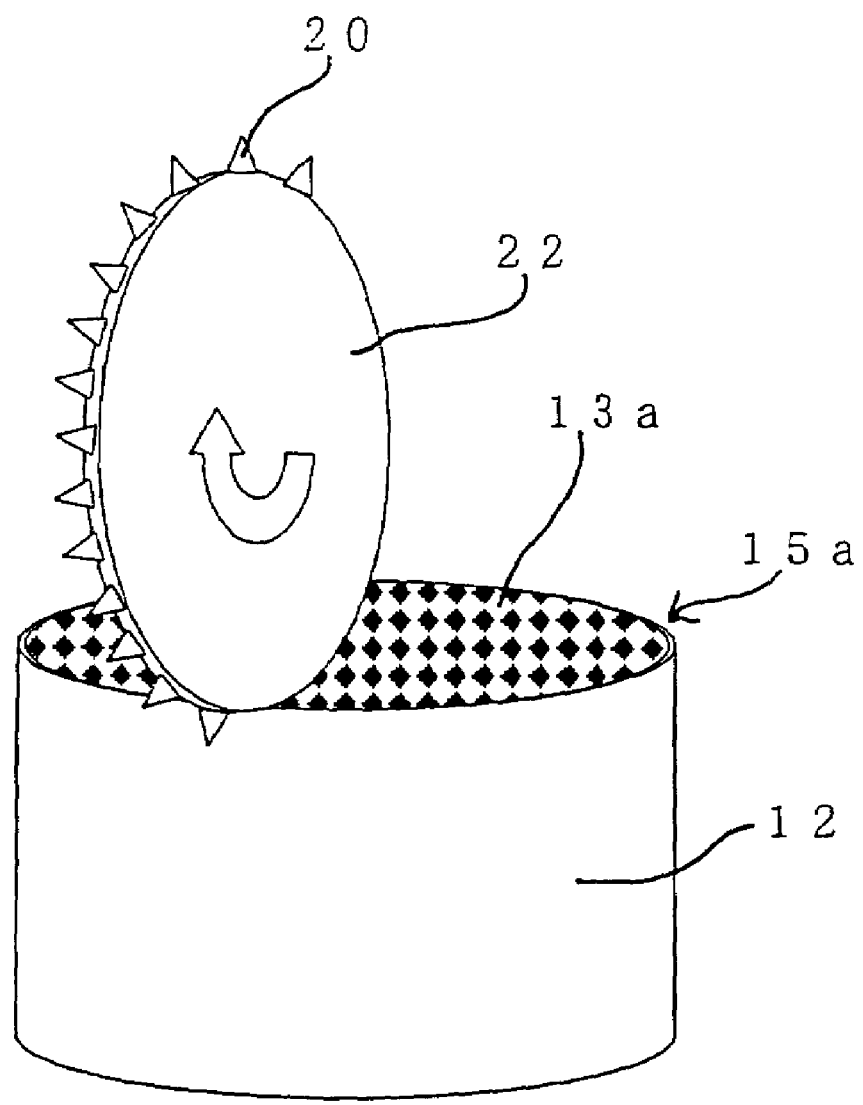
FIG. 11 is a perspective view schematically showing a step of deforming the first fluid channel by use of a columnar die for forming in one embodiment of the method of manufacturing the honeycomb structure of the present invention (second invention)
Figure 12:
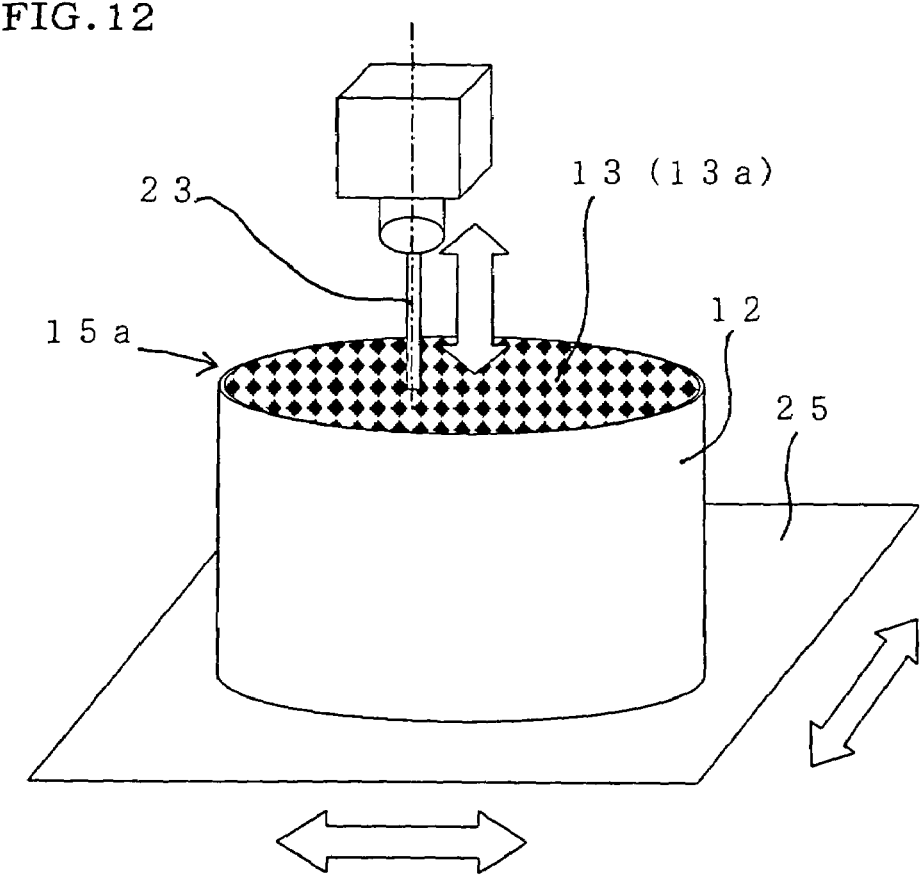
FIG. 12 is a perspective view schematically showing a step of deforming the first fluid channel by the use of a needle-shaped member for forming in one embodiment of the method of manufacturing the honeycomb structure of the present invention (second invention)
Figure 13:
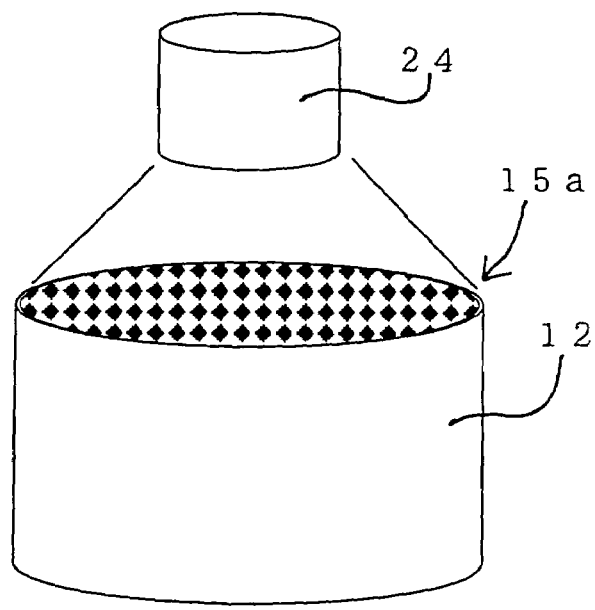
FIG. 13 is a perspective view schematically showing a step of picking up an image of the first end surface of a non-fired porous body in one embodiment of the method of manufacturing the honeycomb structure of the present invention (second invention)

In the method of manufacturing the conventional honeycomb structure, the plugging material is selectively charged into either the portion (end portion) having the predetermined length from the second end surface or the portion (end portion) having the predetermined length from the first end surface in the fluid channels formed in the non-fired porous body to form the first fluid channel charged from the second end surface and to form the second fluid channel charged from the first end surface. However, in the present embodiment, one or more of the first fluid channels are deformed in the shape in which the opening area (area (S1)) in the first end surface is larger than the sectional area (area (S2)) vertical to the central axis in the position in the predetermined depth from the first end surface and in which the sectional area (area (S3)) vertical to the central axis in the middle between the first end surface and the position in the predetermined depth gradually decreases to the area (S2) from the area (S1), before charging the plugging material into the end portion of the second fluid channel on the first end surface side. Examples of a method of deforming the first fluid channel into the above-described shape include: a method in which a plate-shaped die for forming 21 including a plurality of protrusions 20 formed on the surface is pressed onto a first end surface 15a of a non-fired porous body 12 to change the shape of a corresponding first fluid channel 13a as shown in FIG. 10(a) and 10(b); and a method in which a columnar die for forming 22 including a plurality of protrusions 20 formed on the peripheral side surface is rotated and pressed onto the first end surface 15a of the non-fired porous body 12 to change the shape of the corresponding first fluid channel 13a as shown in FIG. 11. When the shape of the corresponding first fluid channel 13a is changed by the use of the plate-shape form for forming 21, as shown in FIG. 10(a), all the corresponding first fluid channels 13a may also be deformed once using a form for forming 21a having a size capable of covering the whole first end surface 15a of the non-fired porous body 12. Alternatively, as shown in FIG. 10(b), the channels may be deformed a plurality of times using a form for forming 21b having a size capable of covering a part of the first end surface 15a of the non-fired porous body 12. As shown in FIG. 12, a needle-shaped member for forming 23 may be stuck into the first end surface 15a of the non-fired porous body 12 to change the shape of the corresponding first fluid channel 13a. In this case, as shown in FIG. 13, an image of the first end surface 15a of the non-fired porous body 12 is picked up by a CCD camera 24, and the picked-up image is preferably processed to specify a position into which the member for forming 23 (see FIG. 12) is to be stuck. By this constitution, as shown in FIG. 12, the non-fired porous body 12 is laid on an NC control table 25 capable of NC-scanning in x and y-directions. The NC control table 25 is moved so as to correct a subtle difference of an arrangement pitch of fluid channels 13 or distortion in the first end surface 15a of the non-fired porous body 12 based on image-processed data. It is thus possible to stick the member for forming 23 into the end portion of the predetermined first fluid channel 13a, and the shape of the channel can be changed with good precision.

Moreover, to change the shape of the first fluid channel, when the non-fired porous body forming the fluid channel is excessively dried and plasticity is lost, water is added to the first end surface of the non-fired porous body to restore the plasticity of the non-fired porous body before changing the shape of the first fluid channel. In the present embodiment, the shape of the first fluid channel whose area (S3) gradually decreases to the area (S2) from the area (S1) is preferably changed into the truncated cone shape, temple bell shape, or morning glory shape. When a material containing a forming auxiliary agent comprising a thermoplastic resin is used as the above-described raw material, after forming and cooling the non-fired porous body, the end portion of the body is preferably heated to develop the plasticity in the non-fired porous body. When the plugging material is charged into each fluid channel and thereafter the corresponding end portion of the non-fired porous body is deformed, the thermoplastic resin is also preferably added to the plugging material.

Next, although not shown, the plugging material is charged into the end portion of the second fluid channel on the first end surface side. Concretely, films such as a polyester film are attached to the first end surface of the non-fired porous body. Polyester (film) is preferably used as a film material. Moreover, when the one surface of the film is coated with an adhesive, the film can easily be attached to the end surface of the non-fired porous body. Moreover, for the film attached to the end surface, holes are made in a portion of the end surface of the non-fired porous body in which the second fluid channel by an NC scannable laser device.

Next, water, binder, glycerin are added to the cordierite raw material to prepare a plugging material of about 200 dPa·S, and the plugging material is brought in a container for charging. The non-fired porous body to which the film has been attached is pressed into this container for charging from a film attached side, and the plugging material in the container for charging is charged into the second fluid channel via the holes of the film. After the charging is completed, the non-fired porous body is taken out of the container for charging. The non-fired porous body in which the plugging material is charged in the end portion of the second fluid channel in the first end surface of the non-fired porous body is prepared in this manner.

Next, hot air at about 140° C. is applied to the first end surface of the non-fired porous body in which the plugging material is charged into the end portion of the second fluid channel to dry the end surface without stripping any film. This drying may also be performed by the use of a hot plate or the like.

Next, the plugging material is charged into the end portion of the first fluid channel of the non-fired porous body on the second end surface side in the same manner as in the above-described method. In this case, in the present embodiment, one or more of the second fluid channels may also be deformed in the shape in which the opening area (area (S4)) in the second end surface is larger than the sectional area (area (S5)) vertical to the central axis in the position in the predetermined depth from the second end surface and in which the sectional area (area (S6)) vertical to the central axis in the middle between the second end surface and the position in the predetermined depth gradually decreases to the area (S5) from the area (S4), before or after charging the plugging material into the end portion of the first fluid channel on the second end surface side. In this manner, when the areas (S1) and (S4) of the open end surfaces of the first and second fluid channels are increased in the opposite end surfaces of the non-fired porous body, the pressure loss related to the inflow and outflow of the exhaust gas can effectively be reduced in a case where the honeycomb structure that is a final product is used, for example, as the DPF.

The method of changing one or more shapes of the second fluid channel before charging the plugging material into the end portion of the first fluid channel on the second end surface side can be performed in the same manner as in the above-described method of changing the shape of the first fluid channel. In a method of changing the shapes of one or more second fluid channels after charging the plugging material into the end surface of the first fluid channel on the second end surface side, first the plugging material is charged into the end portion of the first fluid channel on the second end surface side in the same manner as in the above-described method of charging the plugging material into the end portion of the second fluid channel. Next, one or more shapes of the second fluid channel may be changed in the same manner as in the above-described method. To change the shapes of one or more second fluid channels, the shape of the second fluid channel whose area (S6) gradually decreases to the area (S5) from the area (S4) is also preferably changed into the truncated cone shape, temple bell shape, or morning glory shape. The hot air at about 140° C. is applied on the second end surface side of the non-fired porous body in which the plugging material is charged into the end portion of the first fluid channel to dry the end surface without stripping any attached film.

Next, the non-fired porous body obtained in this manner is fired to manufacture the honeycomb structure comprising the porous body in which the plugging material is charged into the fluid channel.

It is to be noted that, in the present embodiment, one or more of the first fluid channels may also be formed in the shape in which the opening area (area (S1)) in the first end surface of the porous body is larger than the sectional area (area (S2)) vertical to the central axis in the position in the predetermined depth from the first end surface. For example, the channel may also be deformed in such a manner that the opening areas (areas (S1)) of all the first fluid channels increase, or the first fluid channels may be regularly or irregularly deformed every other channel. This also applies to a case where the shape of the second fluid channel in the second end surface of the porous body is changed.

Moreover, to constitute the honeycomb structure in which a plurality of segments are integrated, after obtaining the segments in the above-described method, the obtained segments can be bonded, for example, using the ceramic cement, and dried/hardened to manufacture the honeycomb structure. A method of allowing the honeycomb structure manufactured in this manner to carry the catalyst may be a method usually performed by a person skilled in the art. For example, the catalyst slurry can be wash-coated, dried, and fired to carry the catalyst.

Next, one embodiment of the method of manufacturing the honeycomb structure of the present invention (third invention) will be concretely described. In the method of manufacturing the honeycomb structure of the present embodiment, a raw material, which is to be fired to form the porous body, is extruded/formed to form the non-fired porous body in which a plurality of fluid channels extending to the second end surface from the first end surface are formed. The plugging material is selectively charged into either the portion (end portion) having the predetermined length from the second end surface or the portion (end portion) having the predetermined length from the first end surface in the fluid channels formed in the non-fired porous body to form the first fluid channel charged from the second end surface and to form the second fluid channel charged from the first end surface. Thereafter, the non-fired porous body is fired to manufacture the honeycomb structure comprising the porous body in which the plugging material is charged in the fluid channel. After charging the plugging material into the end portion of the second fluid channel on the first end surface side, one or more of the first fluid channels are deformed in a shape in which the opening area (area (S1)) in the first end surface is larger than the sectional area (area (S2)) vertical to the central axis in the position in the predetermined depth from the first end surface and in which the sectional area (area (S3)) vertical to the central axis in the middle between the first end surface and the position in the predetermined depth gradually decreases to the area (S2) from the area (S1).

In the present embodiment, unlike the second invention, after charging the plugging material into the end portion of the second fluid channel on the first end surface side, one or more shapes of the first fluid channel are changed. By this constitution, the function and effect similar to those of the embodiment of the second invention can be obtained. Additionally, when the plugging material is charged into the end portion of the second fluid channel on the first end surface side, moisture contained in the plugging material is absorbed by the non-fired porous body, plasticity in the vicinity of the first end surface of the non-fired porous body is restored, and the first fluid channel is easily deformed.

Moreover, in the present embodiment, in the same manner as in the embodiment of the second invention, one or more of the second fluid channels is preferably deformed in a shape in which the opening area (area (S4)) in the second end surface is larger than the sectional area (area (S5)) vertical to the central axis in the position in the predetermined depth from the second end surface and in which the sectional area (area (S6)) vertical to the central axis in the middle between the second end surface and the position in the predetermined depth gradually decreases to the area (S5) from the area (S4), before or after charging the plugging material into the end portion of the first fluid channel on the second end surface side.

It is to be noted that the raw material constituted in the same manner as in that described in the embodiment of the second invention is preferably usable in the raw material for use in the method of manufacturing the honeycomb structure of the present embodiment. The method described in the embodiment of the second invention is preferably usable in the method of charging the plugging material or the method of deforming the first and second fluid channels.

Next, one embodiment of the method of manufacturing the honeycomb structure of the present invention (fourth invention) will be concretely described. In the method of manufacturing the honeycomb structure of the present embodiment, the raw material, which is to be fired to form the porous body, is extruded/formed to form the non-fired porous body in which a plurality of fluid channels extending to the second end surface from the first end surface are formed. The plugging material is selectively charged into either the portion (end portion) having the predetermined length from the second end surface or the portion (end portion) having the predetermined length from the first end surface in the fluid channels formed in the non-fired porous body to form the first fluid channel charged from the second end surface and to form the second fluid channel charged from the first end surface. Thereafter, the non-fired porous body is fired to manufacture the honeycomb structure comprising the porous body in which the plugging material is charged in the fluid channel. After firing the non-fired porous body, one or more of the first fluid channels are deformed in the shape in which the opening area (area (S1)) in the first end surface is larger than the sectional area (area (S2)) vertical to the central axis in the position in the predetermined depth from the first end surface and in which the sectional area (area (S3)) vertical to the central axis in the middle between the first end surface and the position in the predetermined depth gradually decreases to the area (S2) from the area (S1).

Figure 14:
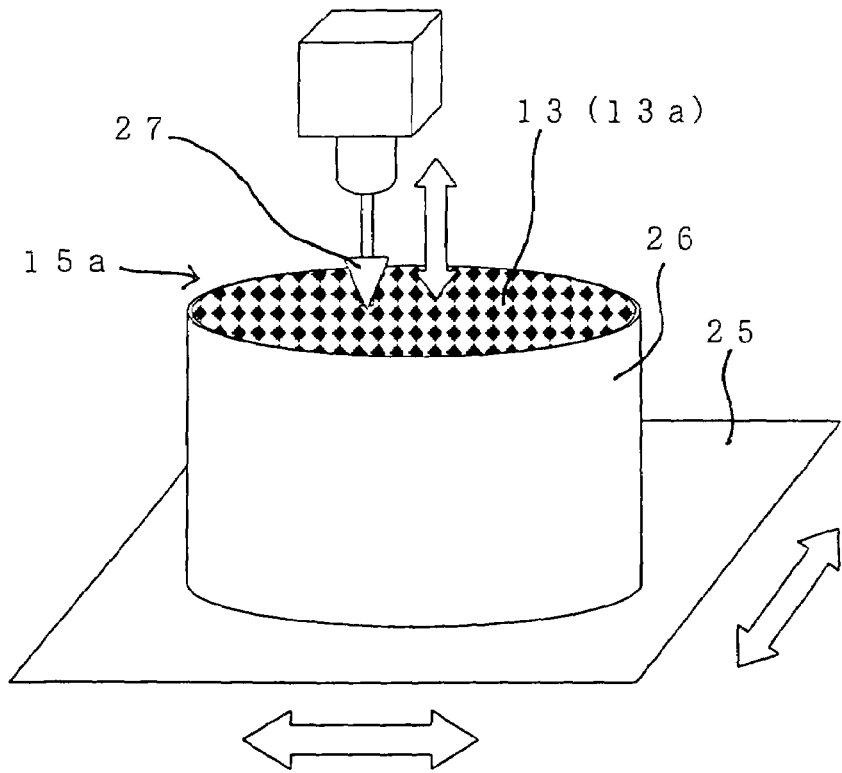
FIG. 14 is a perspective view schematically showing a step of deforming the first fluid channel by the use of a conical grindstone in one embodiment of the method of manufacturing the honeycomb structure of the present invention (fourth invention)
Figure 15:
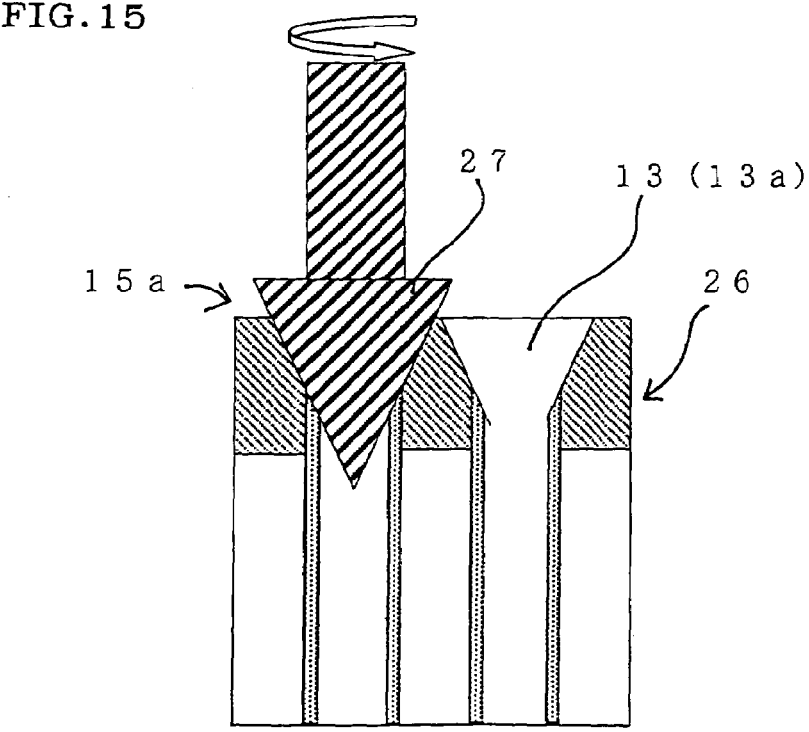
FIG. 15 is a sectional view showing the non-fired porous body cut in parallel with the central axis in one embodiment of the method of manufacturing the honeycomb structure of the present invention (fourth invention)
Figure 16:
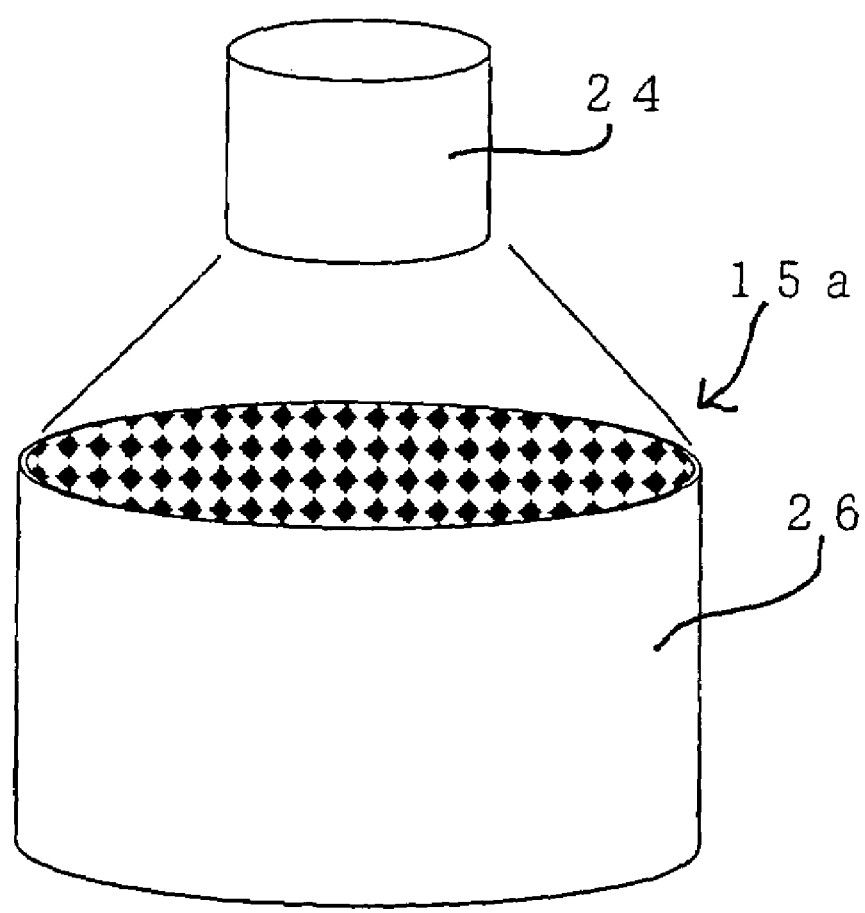
FIG. 16 is a perspective view schematically showing a step of picking up the image of the first end surface of the porous body in one embodiment of the method of manufacturing the honeycomb structure of the present invention (fourth invention)

Concretely, first, the non-fired porous body is formed, the plugging material is charged into the fluid channel formed in the obtained non-fired porous body, and the non-fired porous body in which the plugging material has been charged is fired to form the porous body in which the plugging material is charged in the fluid channel in the same manner as in the embodiment of the second invention. Next, one or more of the first fluid channels are deformed in the shape in which the opening area (area (S1)) in the first end surface is larger than the sectional area (area (S2)) vertical to the central axis in the position in the predetermined depth from the first end surface and in which the sectional area (area (S3)) vertical to the central axis in the middle between the first end surface and the position in the predetermined depth gradually decreases to the area (S2) from the area (S1). The examples of the method of deforming the end portion include: a method in which first end surface 15a of a porous body 26 is preferably processed/removed using a conical grindstone 27 to deform the corresponding first fluid channel 13a as shown in FIGS. 14 and 15. When the grinding/processing is performed as the method of the processing/removing as described above, as shown in FIG. 16, the image of the first end surface 15a of the porous body 26 is picked up by the CCD camera 24 or the like, and the picked-up image is preferably processed to specify the position to be processed/removed (ground/processed). By this constitution, as shown in FIG. 14, the porous body 26 is laid on the NC control table 25 capable of NC-scanning in the x and y-directions. The NC control table 25 is moved so as to correct the subtle difference of the arrangement pitch of the fluid channels 13 or distortion in the first end surface 15a of the porous body 26 based on image-processed data. It is thus possible to process/remove (grind/process) the end portion of the predetermined first fluid channels 13a, and the shape of the channel can be changed with the good precision. By this constitution, the honeycomb structure 30 shown in FIG. 9(a) can be manufactured simply at the low cost. The processing/removing method is not limited to the grinding/processing. For example, when the honeycomb structure is formed of a metal material, the corresponding first fluid channel 13a may also be deformed even by discharge processing by the use of a conical electrode.

Moreover, in the present embodiment, after firing the porous body, one or more of the second fluid channels may be preferably deformed in the shape in which the opening area (area (S4)) in the second end surface is larger than the sectional area (area (S5)) vertical to the central axis in the position in the predetermined depth from the second end surface and in which the sectional area (area (S6)) vertical to the central axis in the middle between the second end surface and the position in the predetermined depth gradually decreases to the area (S5) from the area (S4). As the method of deforming the second fluid channel, in the same manner as in the deformation of the first fluid channel, the channel is preferably processed/removed (ground/processed) using the conical grindstone 27 shown in FIG. 14.

EXAMPLES

The present invention will be described concretely in accordance with examples hereinafter, but the present invention is not limited to these examples.

Example 1

First, the foaming resin was added as the pore former to silica, kaolin, talc, and alumina which were cordierite raw materials, further the binder, dispersant, and water were added, and the materials were kneaded to form the clay-like raw material. The obtained raw material was extruded/formed by the use of the die for extruding the honeycomb structure having the predetermined shape to form the non-fired porous body in which a plurality of fluid channels extending to the second end surface from the first end surface were formed.

Next, the obtained non-fired porous body was dried by a combination of microwave drying or dielectric drying with hot air drying, and the dried non-fired porous body was cut in a predetermined length.

The polyester film was attached to the end surface of the non-fired porous body obtained in this manner, and the holes were made in the polyester film by the NC scannable laser device so that the predetermined fluid channel (second fluid channel) was opened in the first end surface of the non-fired porous body.

Thereafter, water, binder, glycerin were separately added to the cordierite raw material to prepare the plugging material of about 200 dPa·S, and the plugging material was brought in the container for charging. Furthermore, the first end surface of the non-fired porous body to which the film was attached was pressed into this container for charging, and the plugging material was charged into the end surface of the fluid channel (second fluid channel) in a depth of 3.0 mm from the first end surface via the holes made in the film.

Thereafter, the fluid channels (first fluid channels) other than the channels in which the plugging material was charged were deformed into the shape in which the opening area (area (S1)) in the first end surface was larger than the sectional area (area (S2)) vertical to the central axis in the position in the predetermined depth from the first end surface and in which the sectional area (area (S3)) vertical to the central axis in the middle between the first end surface and the position in a depth of about 5 mm gradually decreased to the area (S2) from the area (S1). In the present embodiment, the area (S1) was about 6.5 mm$^2$, and the area (S2) was about 4.5 mm$^2$.

Next, after charging the plugging material into the end portion of the first fluid channel of the non-fired porous body on the second end surface side, the non-fired porous body was fired to manufacture the honeycomb structure comprising the porous body in which the plugging material was charged into the fluid channel.

For the honeycomb structure of the present embodiment, the diameter of each of the first and second end surfaces was set to about 229 mm, the length in the flow direction of the fluid was about 150 mm, the shape of the section vertical to the central axes of the first and second fluid channels was square, and the thickness of the porous body in the portion constituting the inner wall of each fluid channel was about 0.4 mm (0.017 inch). The interval (cell pitch) between the adjacent fluid channels was about 2.5 mm, and 100 fluid channels were formed per square inch in the section vertical to the central axis of the honeycomb structure. The length of the plugging material charged into the fluid channel from the first and second end surfaces was about 3 mm with respect to both the end surfaces. When the porosity of the porous body constituting the obtained honeycomb structure was measured by the mercury porosimeter, the porosity was 66%, and the average pore diameter was 22 μm.

Comparative Example 1

A honeycomb structure was manufactured in which the sectional area vertical to the central axes of the first and second fluid channels was equal to the second end surface from the first end surface in the same manner as in Example 1 except that the opening area (area (S1)) of the first fluid channel in the first end surface was not deformed.

Figure 17:
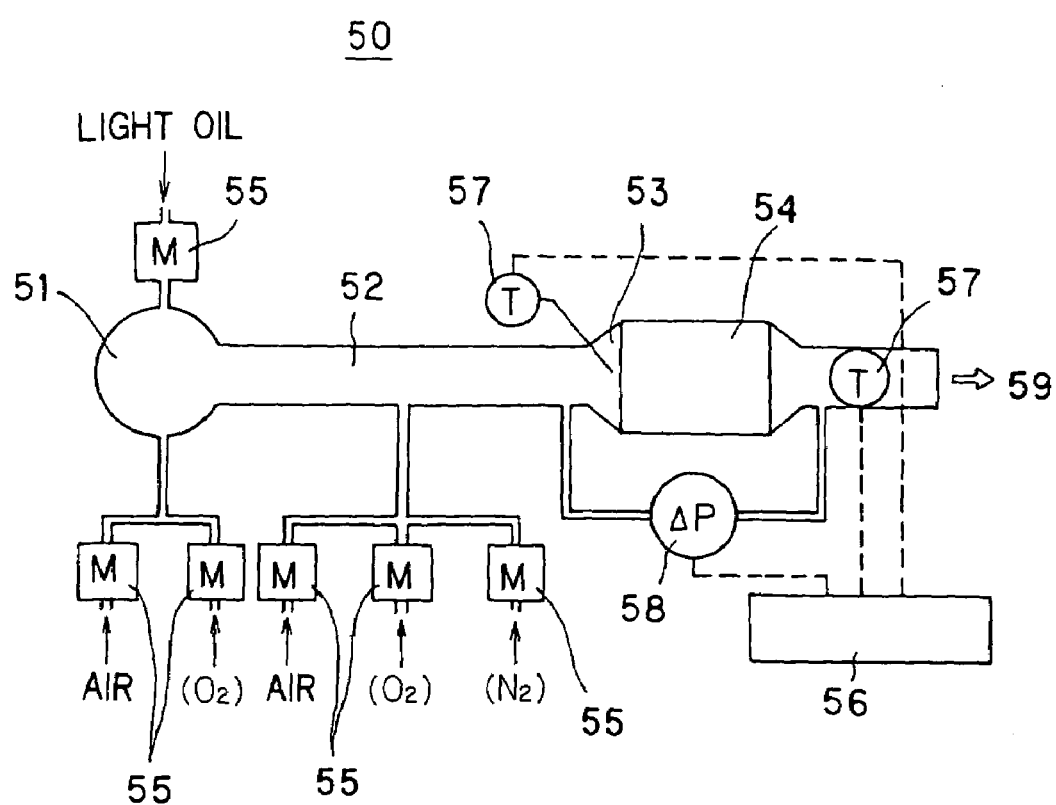
FIG. 17 is an outline constitution diagram of a soot generator for use in the embodiment of the present invention.

The obtained honeycomb structures (example and comparative example) were subjected to a particulate material deposition test by the use of a soot generator, and the pressure losses of the honeycomb structures (example and comparative example) by the deposited particulate material were measured. As shown in FIG. 17, a soot generator 50 includes: a combustion chamber 51 capable of generating a large amount of particulate materials by combustion of a light oil in the chamber; a passage channel 52 through which combustion gas and particulate materials generated in the combustion chamber 51 pass; and a test chamber 53 which communicates with the passage channel 52 and in which a honeycomb structure 54 is disposed and which is capable of depositing a large amount of particulate materials in the honeycomb structure 54 in a short time. Flow rate meters 55 are disposed in the combustion chamber 51 so that the fuel is supplied, and air or oxygen if necessary can be supplied. The passage channel 52 is provided with the flow rate meter 55 so that air or oxygen and nitrogen if necessary can be supplied. In the test chamber 53, a thermocouple 57 for temperature measurement, connected to a recorder 56, and a pressure gauge 58 for measuring an internal pressure of the test chamber 53 are disposed. The test chamber 53 is connected to an exhaust duct 59 from which a gas flowing through the honeycomb structure 54 from the passage channel 52 is discharged. The temperature of the test chamber 53 at the time of trapping the particulate material was about 200° C., and an air flow rate was 9 Nm$^3$/min. In this case, a particulate material generated amount was 90 g per hour. After measuring the pressure loss of the honeycomb structure 54 by the deposited particulate material, deposited situations of the particulate materials in the end surfaces were confirmed.

Figure 18A:
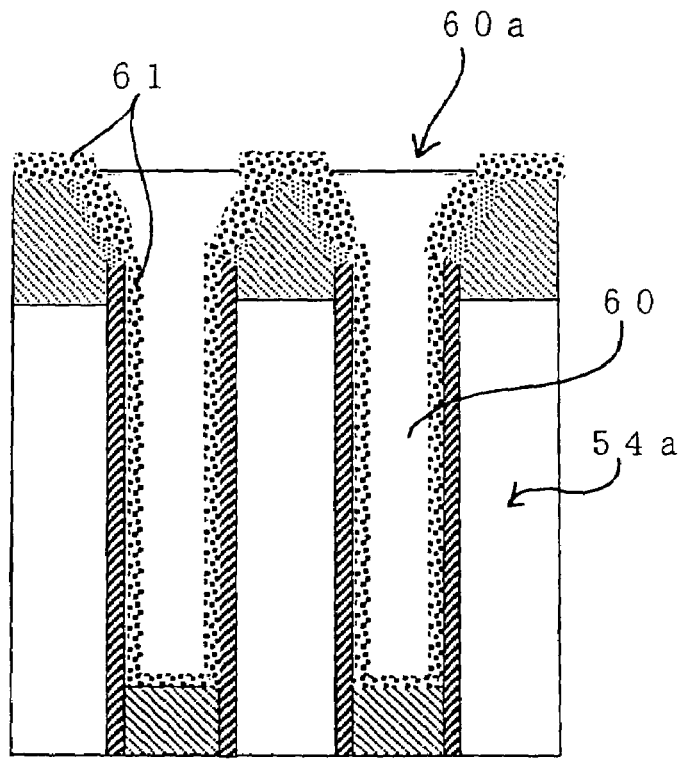
FIGS. 18(a) and 18(b) are sectional views showing a process in which the particulate materials are deposited on the honeycomb structure of the embodiment of the present invention.
Figure 18B:
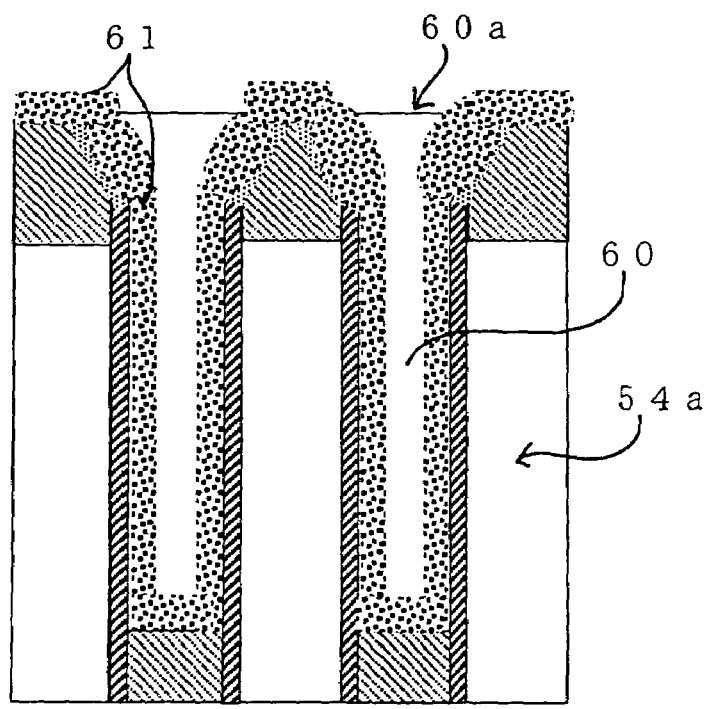

For a honeycomb structure 54a of Example 1, as shown in FIGS. 18(a) and 18(b), since the opening area (area (S1)) of a first end surface 60a of a first fluid channel 60 was enlarged, the end portion on the first end surface 60a side was not blocked by particulate materials 61, and the particulate materials 61 entered the first fluid channel 60. In this manner, the first end surface 60a of the first fluid channel 60 was not blocked by the particulate materials 61 to the last minute, and the pressure loss did not rapidly increase.

Figure 19A:
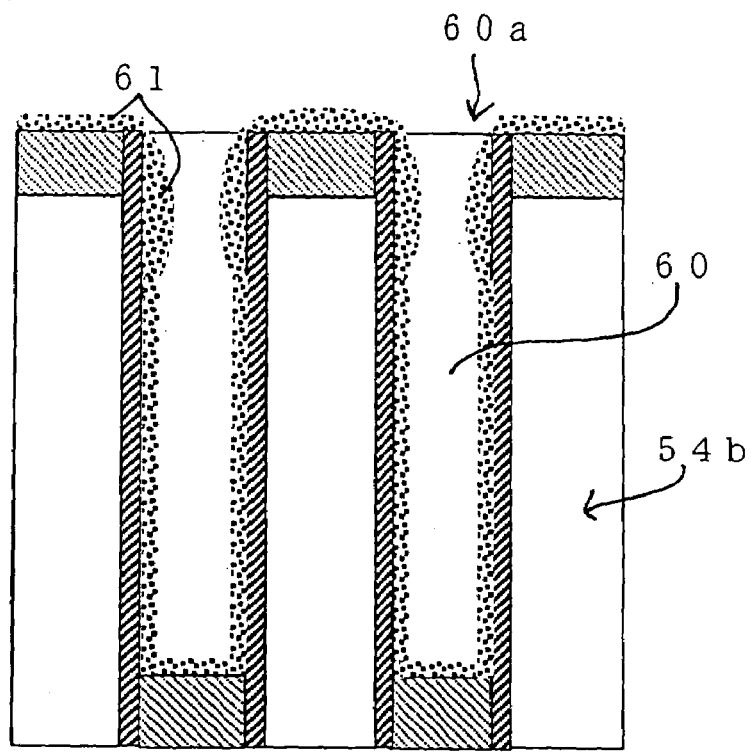
FIGS. 19(a) and 19(b) are sectional views showing the process in which the particulate materials are deposited on the honeycomb structure of a comparative example of the present invention.
Figure 19B:
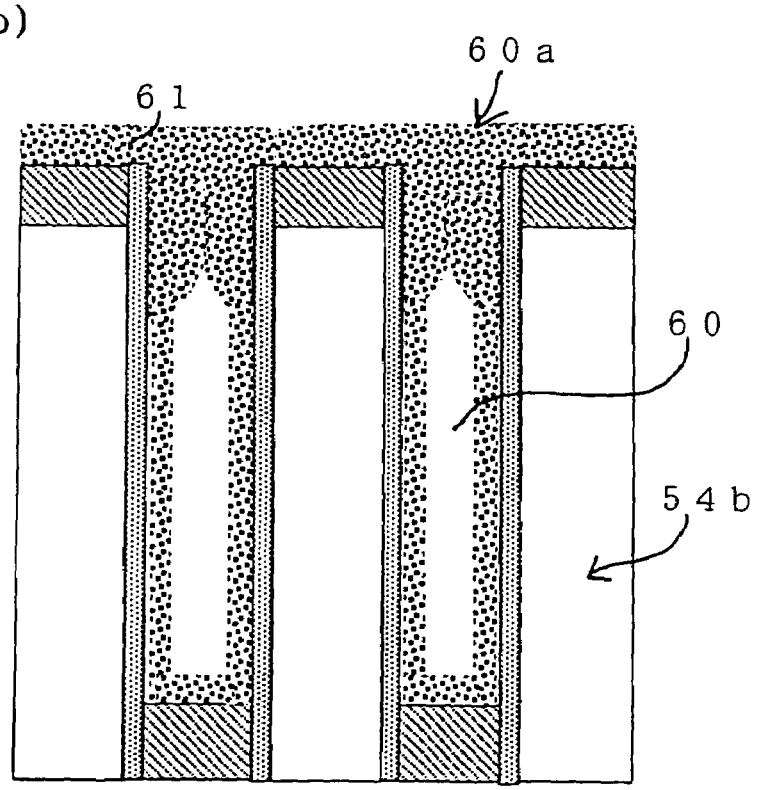

For a honeycomb structure 54b of Comparative Example 1, as shown in FIG. 19(a), first, the particulate materials 61 were deposited on the first end surface 60a of the first fluid channel 60, and the opening area of the first end surface 60a of the first fluid channel 60 was narrowed. Thereafter, the particulate materials 61 were further deposited. As shown in FIG. 19(b), the first end surface 60a of the first fluid channel 60 was blocked, and the pressure loss rapidly rose.

Example 2

In the same manner as in the manufacturing of the honeycomb structure of Example 1, a honeycomb structure (Example 2) was manufactured in which the diameter of each of the first and second end surfaces was set to about 144 mm, the length in the flow direction of the fluid was about 152 mm, the shape of the section vertical to the central axes of the first and second fluid channels was square, and the thickness of the porous body in the portion constituting the inner wall of each fluid channel was about 0.3 mm (0.012 inch). For the honeycomb structure of the present embodiment, the interval (cell pitch) between the adjacent fluid channels was about 1.5 mm, and 300 fluid channels were formed per square inch in the section vertical to the central axis of the honeycomb structure. Moreover, for the first end surface, the fluid channels (first fluid channels) other than the channels in which the plugging material was charged were deformed into the shape in which the opening area (area (S1)) in the first end surface was larger than the sectional area (area (S2)) vertical to the central axis in the position in a depth of about 3 mm from the first end surface and in which the sectional area (area (S3)) vertical to the central axis in the middle between the first end surface and the position in a depth of about 3 mm gradually decreased to the area (S2) from the area (S1). In the present embodiment, the area (S1) was about 2 mm$^2$, and the area (S2) was about 1.5 mm$^2$. Moreover, the length of the plugging material charged in the fluid channel from the first and second end surfaces was 3 mm with respect to both the end surfaces.

Figure 20:
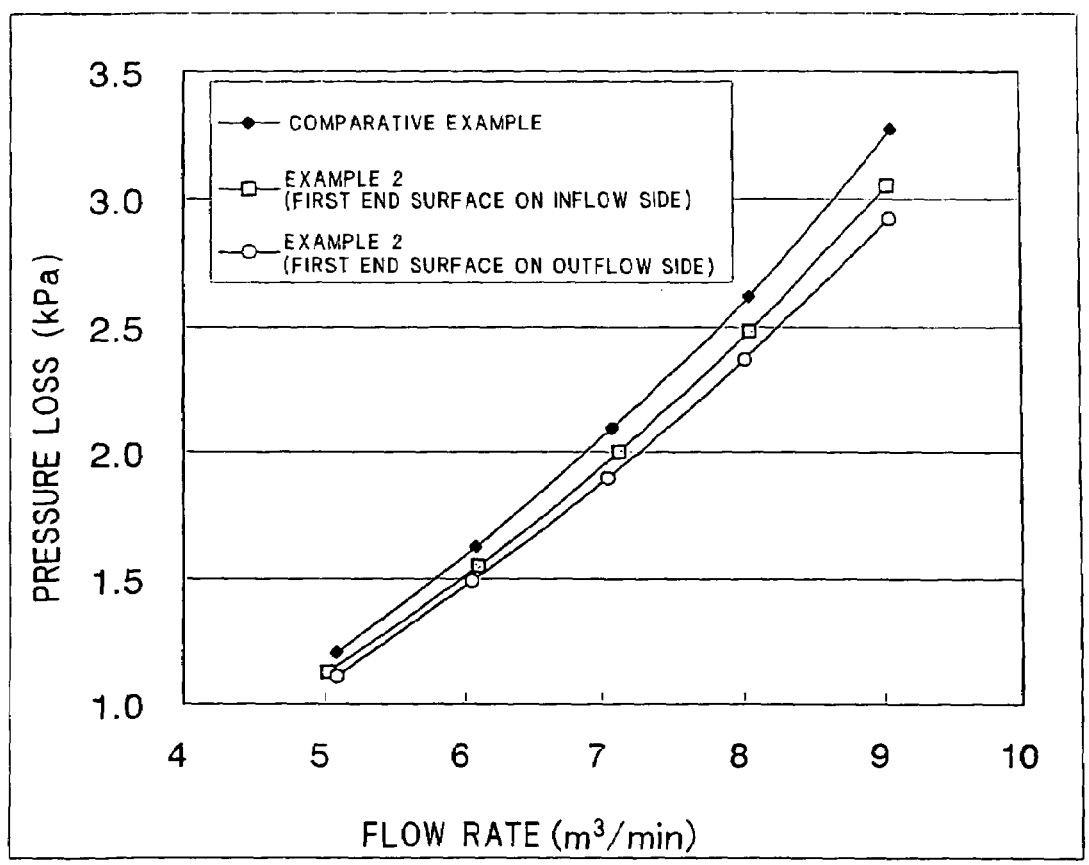
FIG. 20 is a graph showing a relation between a flow rate ($m^3$/min) of a passed gas and a pressure loss (kPa) in honeycomb structures of Example 2 and Comparative Example 1.
Figure 21A:
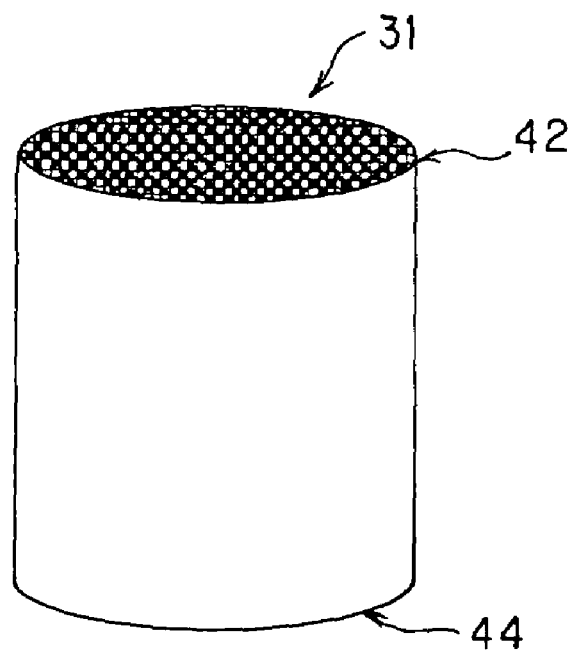
FIG. 21(a) is a perspective view showing the conventional honeycomb structure.
Figure 21B:
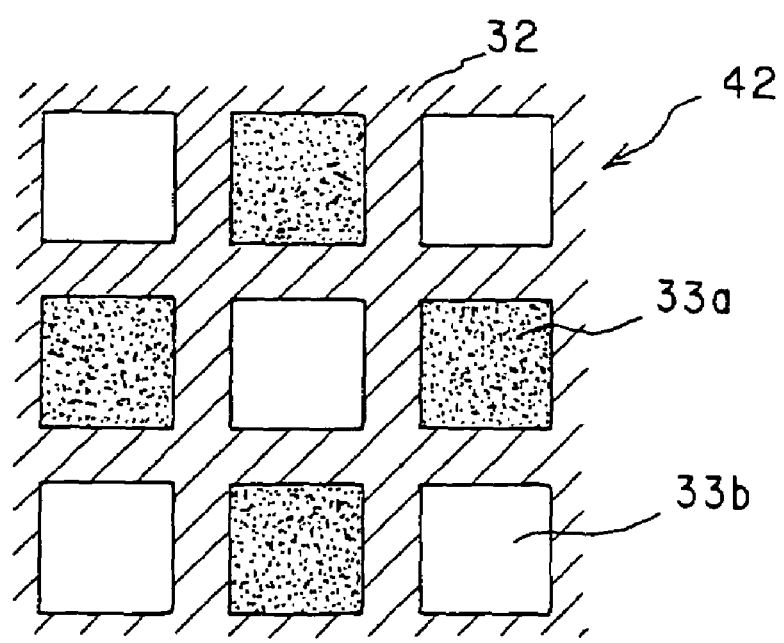
FIG. 21(b) is an enlarged plan view of the cell constituting the conventional honeycomb structure.
Figure 22:
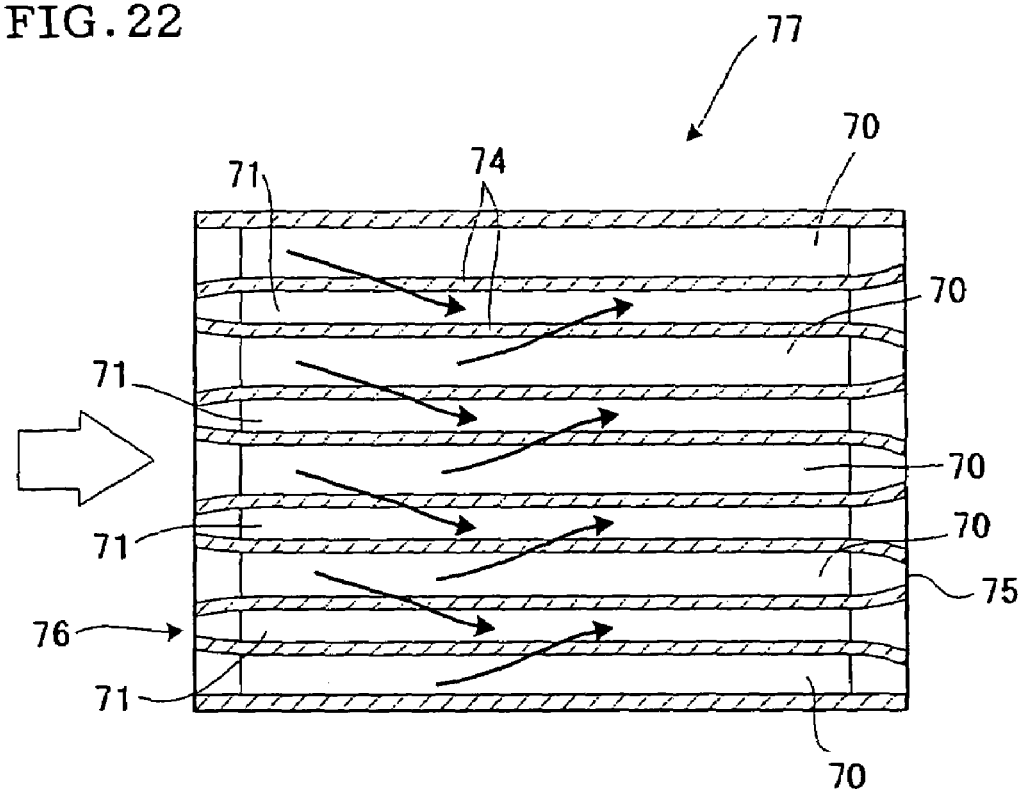
FIG. 22 is a sectional view showing the conventional honeycomb structure.
Figure 23:
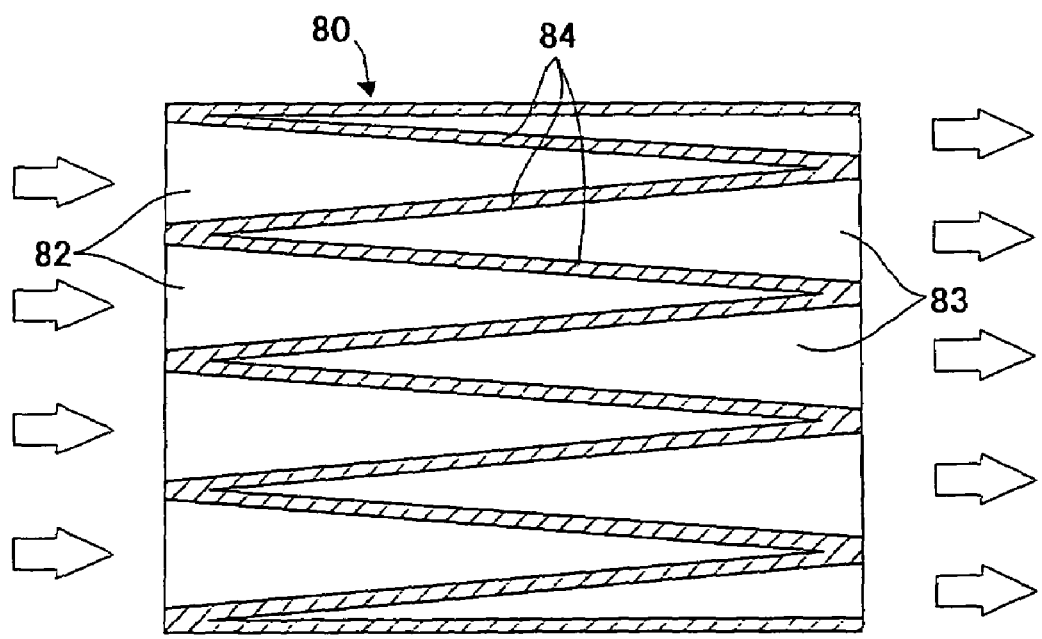
FIG. 23 is a sectional view showing the conventional honeycomb structure.
Figure 24A:
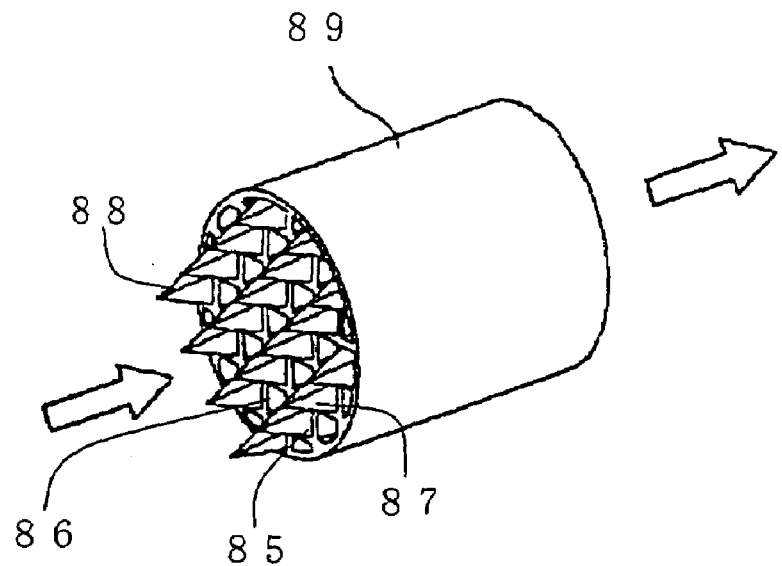
FIG. 24(a) is a perspective view showing the conventional honeycomb structure.
Figure 24B:
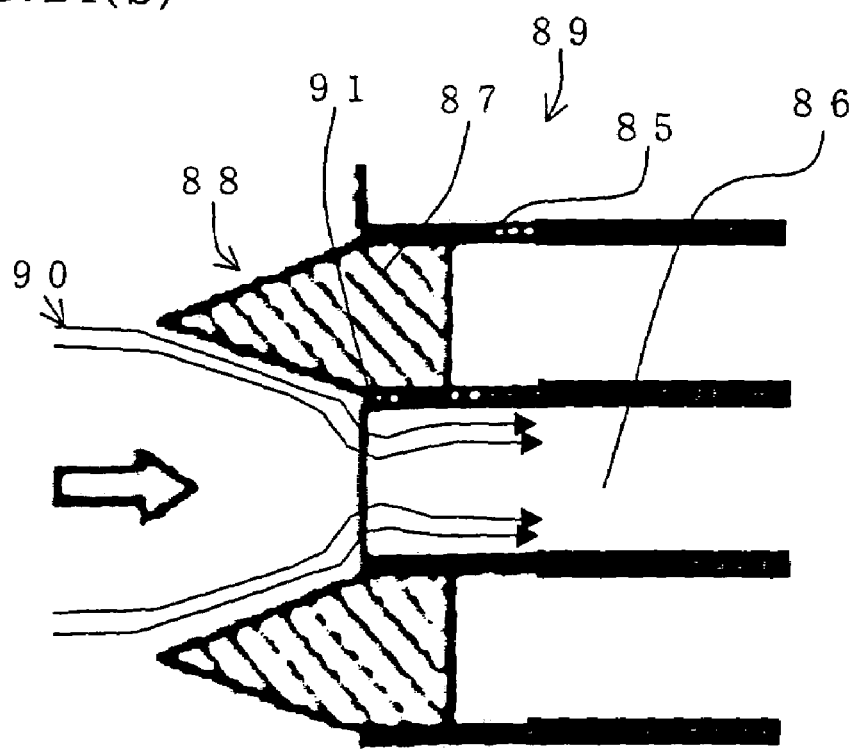
FIG. 24(b) is a sectional view of the conventional honeycomb structure cut in parallel with the central axis.

The honeycomb structures of Example 2 and Comparative Example 1 were installed in the soot generator 50 (FIG. 17) in such a manner that the first end surface corresponded to the end surface on the inflow side, only the air was passed on a condition that the particulate materials were not deposited, and the pressure loss of each honeycomb structure was measured. The installation direction was reversed and the honeycomb structure of Example 2 was installed in the soot generator 50 (FIG. 17) in such a manner that the first end surface corresponded to the end surface on the outflow side, that is, the second end surface corresponded to the end surface on the inflow side. The pressure loss was similarly measured. FIG. 20 is a graph showing a relation between a flow rate ($m^3$/min) of the passed gas and a pressure loss (kPa) in the honeycomb structures of Example 2 and Comparative Example 1. As shown in FIG. 20, it has been confirmed that the pressure loss of the honeycomb structure of Example 2 drops as compared with the honeycomb structure of Comparative Example 1. It has also been confirmed that the pressure loss is further reduced in a case where the first end surface is disposed as the end surface on the outflow side in the honeycomb structure of Example 2.

As described above, according to the present invention, there can be provided a honeycomb structure which is preferably usable as a filter, for example, for trapping particulates in an exhaust gas of an internal combustion engine, boiler or the like or for filtering liquids such as city water and sewage and in which an increase of a pressure loss at a use time is inhibited. A method of manufacturing the honeycomb structure is also provided.

What is claimed is:

1. A honeycomb structure comprising: two end surfaces consisting of first and second end surfaces on respective sides of the honeycomb structure; a porous body in which a plurality of fluid channels extending to the second end surface from the first end surface are formed; and plugging members for plugging end portions of the porous body, the end portions having predetermined lengths from the end surfaces of the fluid channels, the fluid channels comprising first fluid channels whose end portions on the side of the second end surface are plugged by the plugging members and which are opened in the first end surface without being plugged by the plugging members, and second fluid channels whose end portions on the side of the first end surface are plugged by the plugging members and which are opened in the second end surface without being plugged by the plugging members, wherein one or more of the first fluid channels are formed in a shape in which an opening area S1 in the first end surface is larger than a sectional area S2 vertical to a central axis in a position in a predetermined depth from the first end surface and in which a sectional area S3 vertical to the central axis in a middle between the first end surface and the position in the predetermined depth gradually decreases to the area S2 from the area S1, and wherein a part of the porous body constituting an inner wall of the first fluid channel and extending to the position in the predetermined depth from the first end surface is removed, and the inner wall of the first fluid channel comprises the plugging member for plugging the end portion of the adjacent second fluid channel on the first end surface side instead of the removed part of the porous body.

2. The honeycomb structure according to claim 1, wherein the shape of the first fluid channel whosearea S3 gradually decreases to thearea S2 from the area S1 is a truncated cone shape, a temple bell shape, or a morning glory shape.

3. The honeycomb structure according to claim 1, wherein one or more of the second fluid channels are formed in a shape in which an opening area S4 in the second end surface is larger than a sectional area S5 vertical to the central axis in the position in the predetermined depth from the second end surface and in which a sectional area S6 vertical to the central axis in the middle between the second end surface and the position in the predetermined depth gradually decreases to the area S5 from the area S4.

4. The honeycomb structure according to claim 3, wherein a part of the porous body constituting an inner wall of the second fluid channel and extending to the position in the predetermined depth from the second end surface is removed, and the inner wall of the second fluid channel comprises the plugging member for plugging the end portion of the adjacent first fluid channel on the second end surface side instead of the removed part of the porous body.

5. The honeycomb structure according to claim 3, wherein the shape of the second fluid channel whose area S6 gradually decreases to the area S5 from the area S4 is a truncated cone shape, a temple bell shape, or a morning glory shape.

6. The honeycomb structure according to claim 1, wherein the porous body is formed of a material whose main component is a ceramic and/or a metal.

7. The honeycomb structure according to claim 6, wherein the material constituting the porous body contains at least one selected from a group consisting of cordierite, mullite, alumina, spinel, silicon carbide, silicon nitride, aluminum nitride, zirconia, lithium aluminum silicate, aluminum titanate, Fe—Cr—Al-based metal, metal silicon, activated carbon, silica gel, and zeolite.

8. The honeycomb structure according to claim 1, wherein a catalyst is carried on an inner surface of the porous body forming the fluid channel and/or an inside of the porous body.

9. A method of manufacturing a honeycomb structure comprising a porous body in which a plugging material is charged in a fluid channel, the method comprising the steps of: extruding a raw material, which is to be fired to form the porous body, to form a non-fired porous body in which a plurality of fluid channels extending to a second end surface from a first end surface are formed; selectively charging the plugging material into either an end portion having a predetermined length from the second end surface or an end portion having a predetermined length from the first end surface in the fluid channels formed in the non-fired porous body to form a first fluid channel charged from the second end surface and to form a second fluid channel charged from the first end surface; and thereafter firing the non-fired porous body, wherein one or more of the first fluid channels are deformed in a shape in which an opening area S1 in the first end surface is larger than a sectional area S2 vertical to a central axis in a position in a predetermined depth from the first end surface and in which a sectional area S3 vertical to the central axis in a middle between the first end surface and the position in the predetermined depth gradually decreases to the area S2 from the area S1, before or after charging the plugging material into the end portion of the second fluid channel on the first end surface side, the method further comprising the steps of: adding water to the corresponding first and/or second end surface of the non-fired porous body to restore plasticity of the non-fired porous body before changing the shape of the first and/or second fluid channel.

10. The method of manufacturing the honeycomb structure according to claim 9, further comprising the steps of: changing the shape of the first fluid channel whosearea S3 gradually decreases to the area S2 from the area S1 into a truncated cone shape, a temple bell shape, or a morning glory shape.

11. The method of manufacturing the honeycomb structure according to claim 9, further comprising the steps of: deforming one or more of the second fluid channels in a shape in which an opening area S4 in the second end surface is larger than a sectional area S5 vertical to a central axis in a position in a predetermined depth from the second end surface and in which a sectional area S6 vertical to the central axis in a middle between the second end surface and the position in the predetermined depth gradually decreases to the area S5 from the area S4, before or after charging the plugging material into the end portion of the first fluid channel on the second end surface side.

12. The method of manufacturing the honeycomb structure according to claim 11, further comprising the steps of: changing the shape of the second fluid channel whose area S6 gradually decreases to thearea S5 from the area S4 into a truncated cone shape, a temple bell shape, or a morning glory shape.

13. The method of manufacturing the honeycomb structure according to claim 9, further comprising the steps of:
removing a part of the porous body constituting an inner wall of the first fluid channel and extending to the position in the predetermined depth from the first end surface, the inner wall of the first fluid channel comprising the plugging member for plugging the end portion of the adjacent second fluid channel on the first end surface side instead of the removed part of the porous body.

14. The method of manufacturing the honeycomb structure according to claim 9, further comprising the steps of: pressing a plate-shaped die for forming on whose surface a plurality of protrusions are formed onto the first and/or second end surface of the non-fired porous body to change the shape of the corresponding first and/or second fluid channel.

15. The method of manufacturing the honeycomb structure according to claim 9, further comprising the steps of: rotating and pressing a columnar die for forming on whose peripheral side surface a plurality of protrusions are formed onto the first and/or second end surface of the non-fired porous body to change the shape of the corresponding first and/or second fluid channel.

16. The method of manufacturing the honeycomb structure according to claim 9, further comprising the steps of: sticking a needle-shaped member for forming into the first and/or second end surface of the non-fired porous body to change the shape of the corresponding first and/or second fluid channel.

17. The method of manufacturing the honeycomb structure according to claim 16, further comprising the steps of: picking up an image of the first and/or second end surface of the non-fired porous body and processing the picked-up image to specify a position into which the member for forming is to be stuck.

18. A method of manufacturing a honeycomb structure comprising a porous body in which a plugging material is charged in a fluid channel, the method comprising the steps of: extruding a raw material, which is to be fired to form the porous body, to form a non-fired porous body in which a plurality of fluid channels extending to a second end surface from a first end surface are formed; selectively charging the plugging material into either an end portion having a predetermined length from the second end surface or an end portion having a predetermined length from the first end surface in the fluid channels formed in the non-fired porous body to form a first fluid channel charged from the second end surface and to form a second fluid channel charged from the first end surface; and thereafter firing the non-fired porous body to obtain a fired and plugged porous body.

wherein one or more of the first fluid channels are deformed in a shape in which an opening area S1 in the first end surface is larger than a sectional area S2 vertical to a central axis in a position in a predetermined depth from the first end surface and in which a sectional area S3 vertical to the central axis in a middle between the first end surface and the position in the predetermined depth gradually decreases to thearea S2 from thearea S1, after firing the non-fired porous body to obtain the fired and plugged porous body.

19. The method of manufacturing the honeycomb structure according to claim 18, further comprising the steps of: deforming one or more of the second fluid channels in a shape in which an opening area S4 in the second end surface is larger than a sectional area S5 vertical to a central axis in a position in a predetermined depth from the second end surface and in which a sectional area S6 vertical to the central axis in a middle between the second end surface and the position in the predetermined depth gradually decreases to thearea S5 from the area S4, after firing the non-fired porous body.

20. The method of manufacturing the honeycomb structure according to claim 18, further comprising the steps of: processing/removing the first and/or second end surface of the porous body to change the shape of the corresponding first and/or second fluid channel.

21. The method of manufacturing the honeycomb structure according to claim 20, further comprising the steps of: picking up an image of the first and/or second end surface of the porous body and processing the picked-up image to specify a position to be processed/removed.

22. The method of manufacturing the honeycomb structure according to claim 18, further comprising the steps of: removing the first and/or second end surface of the porous body to change the shape of the corresponding first and/or second fluid channel.

* * * * *